(12) United States Patent
Massoels et al.

(10) Patent No.: US 10,806,542 B2
(45) Date of Patent: Oct. 20, 2020

(54) FORCE-CLOSURE OR FORM-CLOSURE POSITIONING OF SURGICAL TEMPLATES FOR GUIDED IMPLANT DENTISTRY

(71) Applicant: DENTSPLY IMPLANTS NV, Hasselt (BE)

(72) Inventors: Jo Massoels, Sint-Truiden (BE); Wouter Polspoel, Hamme-Mille (BE); Dominik Muylaert, Kortenberg (BE)

(73) Assignee: DENTSPLY IMPLANTS NV, Hasselt (BE)

( * ) Notice: Subject to any disclaimer, the term of this patent is extended or adjusted under 35 U.S.C. 154(b) by 0 days.

(21) Appl. No.: 16/336,224

(22) PCT Filed: Sep. 27, 2017

(86) PCT No.: PCT/EP2017/074565
§ 371 (c)(1),
(2) Date: Mar. 25, 2019

(87) PCT Pub. No.: WO2018/060296
PCT Pub. Date: Apr. 5, 2018

(65) Prior Publication Data
US 2019/0209267 A1    Jul. 11, 2019

(30) Foreign Application Priority Data

Sep. 27, 2016  (EP) .................... 16190965

(51) Int. Cl.
*A61C 1/08*  (2006.01)
*A61C 8/00*  (2006.01)
*A61C 9/00*  (2006.01)

(52) U.S. Cl.
CPC ............. *A61C 1/084* (2013.01); *A61C 1/082* (2013.01); *A61C 8/0089* (2013.01); *A61C 9/0053* (2013.01)

(58) Field of Classification Search
CPC ....... A61C 1/084; A61C 1/082; A61C 8/0089; A61C 9/0053
See application file for complete search history.

(56) References Cited

U.S. PATENT DOCUMENTS

| 1,943,668 A | 1/1934 | Hartman |
| 4,968,250 A * | 11/1990 | Small ................ A61C 1/084 433/173 |
| 8,231,634 B2 * | 7/2012 | Mahfouz ............ A61B 5/1075 606/102 |
| 9,226,801 B2 | 1/2016 | Groscurth et al. |

(Continued)

FOREIGN PATENT DOCUMENTS

| FR | 1425512 | 11/1964 |
| JP | 3174866 U | 4/2012 |

(Continued)

OTHER PUBLICATIONS

International Search Report and Written Opinion in related PCT Application No. PCT/EP2017/074565, dated Jan. 3, 2018.

(Continued)

*Primary Examiner* — Nicholas D Lucchesi
(74) *Attorney, Agent, or Firm* — Bacon & Thomas, PLLC

(57) ABSTRACT

Surgical templates and methods of manufacture to assist in a surgical procedure such as dental implant placement, where the positioning of the surgical template onto its supporting surface is achieved through using a limited number of contact features that are located such that a force-closure or form closure positioning of the surgical template with respect to the supporting surface is achieved.

28 Claims, 6 Drawing Sheets

(56) References Cited

U.S. PATENT DOCUMENTS

| | | | |
|---|---|---|---|
| 9,579,170 B2* | 2/2017 | Van Lierde | A61C 1/084 |
| 9,844,324 B2* | 12/2017 | Merritt | A61B 6/14 |
| 10,159,542 B2* | 12/2018 | Pesach | A61C 3/02 |
| 10,188,486 B2* | 1/2019 | Schneider | A61C 1/084 |
| 10,206,757 B2* | 2/2019 | Pettersson | A61C 1/084 |
| 2004/0146830 A1 | 7/2004 | Weinstein | |
| 2011/0066267 A1 | 3/2011 | Schmitt | |

FOREIGN PATENT DOCUMENTS

| | | |
|---|---|---|
| KR | 101631261 B1 | 6/2016 |
| WO | 2014015932 A1 | 1/2014 |
| WO | 2014040695 A1 | 3/2014 |
| WO | 2018064022 A1 | 4/2018 |

OTHER PUBLICATIONS

European Search Report in related EP Application No. 16190965.0-1658, dated Mar. 20, 2017.
International Preliminary Examination Report in related PCT Application No. PCT/EP2017/074565, dated Sep. 7, 2018.
Wang, Michael Y., Pelinescu, Diana M., "Optimizing Fixture Layout in a Point-Set Domain," IEEE Transactions on Robotics and Automation, vol. 17, No. 3, Jun. 2001.
Ma, Jie, "Closure Problem and Force Optimization in Fixtures and Robotic Manipulation," 6th Annual IEEE Conference on Automation Science and Engineering, Aug. 21-24, 2010, pp. 350-355.
ISO/ASTM 52900, "Additive Manufacturing—General Principles—Terminology," ISO/ASME International 2015, Reference No. 52900:2015(E), Dec. 15, 2015, 26 pages.

* cited by examiner

FORCE-CLOSURE OR FORM-CLOSURE POSITIONING OF SURGICAL TEMPLATES FOR GUIDED IMPLANT DENTISTRY

The present invention relates to surgical templates, to a method of manufacturing these and a method of designing these, whereby the surgical templates have a repeatable form-closure or force-closure positioning. The present invention also relates to software which can assist in designing surgical templates such as for dental implants as well as images of the surgical templates produced having a repeatable form-closure or force-closure positioning.

BACKGROUND OF THE INVENTION

A dental surgical template is a custom-made device intended for use in surgery for example in assisting placement of dental implants. More specifically, a surgical template can be intended to help the intended user prepare an osteotomy for dental implants and to help the intended user place dental implants according to a pre-operative plan. The surgical template is preferably prepared in a patient specific manner, i.e. it has dimensions that are specific to the anatomy of each patient.

Conventional dental surgical templates are in full contact with or fully indexed against their supporting surface within the intra-oral cavity since their contacting surface is based on the negative of the supporting surface. Deviations, with respect to the original supporting surface, in areas of the surgical template that support on the supporting surface, will result in incorrect positioning of the surgical template onto the supporting surface.

FIG. 1a shows a conventional plastic surgical template 5 that relies completely on full contact with the supporting surface of the teeth 4 or gingiva 7 of a dentition 1. FIG. 1b shows a schematic cross-section through a conventional surgical template 5 as depicted in FIG. 1a at a position where a guiding feature (typically a bushing 14) is assembled, e.g. inserted into the body of the template 5. The body of the surgical template 5 is partly a negative of the supporting surface of the dentition 1 resulting in a continuous, full contact for its support. In the example of FIG. 1b at least a part of the supporting surface is shown as the gingiva 7 whereas in FIG. 1a the supporting surface is shown as the full contact with a tooth 4. As shown in FIG. 1b the space 8 below the bushing 14 is covered on each side by the template 5 right down to the gingiva 7 on both sides so that the proposed implant site 6 is not visible to the dentist. Also there is a restricted possibility to provide irrigation for the drilling operation when a drill is inserted through bushing 14 and is used to drill the bore for receipt of the implant because of the cloaking of the implant site by the template 5. In FIG. 2 and also FIG. 2 cross-sections through a known surgical template are shown, wherein the body of the surgical template is at least partly a negative of the supporting surface resulting in full contact. In FIGS. 2 and 3 the supporting surface is a tooth 4 and also the gingiva 7. In FIG. 2 the template 5 is supported by most of the surface of tooth 4 and the gingiva 7. In FIG. 3 the template 5 is supported by parts of the surface of tooth 4 and gingiva 7. As the gingiva is compressible, the position and orientation of the template can change during surgery.

Conventional surgical templates used for assisting in the placement of dental implants are held in place during surgery through finger pressing the template onto a supporting surface, or through fixating it to the jawbone using screws or pins in a pre-drilled osteotomy. Manually holding the surgical template in place adds complexity to the surgical operation as it requires additional assistance, i.e. an 'extra hand', which also can result in more limited operational freedom and more limited intra-oral visibility. Fixating the surgical template using fixation screws or fixation pins in a pre-drilled osteotomy adds additional invasive aspect to the surgery.

U.S. Pat. No. 9,226,801 B2, entitled "Custom linkable imaging and multifunctional tray", refers to a tray that can be a surgical template that is designed from a digital representation of a rigid part of an intra-oral anatomy and that contacts that intra-oral anatomy in a distinct set of contact features. However, the shape of these contact features described in that patent is not specifically defined and can be, although limited in contact area, continuous in nature. Contact over a continuous area is susceptible to interfering deformations, or protrusions that can result from imperfect scanning or manufacture. Furthermore, the location of these contact features is by now no means subject to an evaluation against a certain mathematical condition (such as the form-closure condition) prior to manufacturing (i.e. during digital design) and only requires a contact feature extending from the top wall of the template and at least one contact feature extending form the lateral wall of the template. This patent does include an embodiment with a "reciprocating contact" preventing an oral structure from moving during installation and removal of the template. It is however not described how this reciprocating contact is achieved, i.e. its shape and location are not specifically defined such that immobilization is ensured.

US patent application US2011/0066267 A1 describes a method of creating a surgical drill guide that supports on a rigid part of a patient's intra-oral anatomy. In a preferred embodiment, the surgical template is supported on at least 3 (three) teeth to provide a stabilizing tripod effect. This particular embodiment guarantees that the surgical template remains stable on the supporting surface (teeth) only for certain conditions of external force. For example, the template will probably remain in a stable position when a vertical downward force is applied, but it will by no means remain in place when a lateral or upward force is applied to the template.

International patent application WO 2014/040695 A1 also describes a method for producing a surgical template to create an osteotomy according to a pre-operative plan. A digital representation of a patient's intra-oral structure is used as basis for a digital design of the surgical template. However, the surgical template contacts the supporting surface in a continuous manner and therefore does not comply with a pre-determined location condition except not surpassing the boundary of the supporting surface.

US patent application 2004/0146830 describes an template for measuring the surface geometry of a patient jaw bone through contact measurement using distinct pin-shaped contact tips. Through locking of these pins, the position of the template can be immobilized onto the bone structure. An embodiment can be a drill guiding feature attached to that template rendering it into a surgical template for osteotomy creation. Although this patent application describes the support of a surgical template on a rigid intra-oral structure through distinct contact points, the location of these contact points are by no means determined prior to the manufacturing of the template. Since the position of the template is not determined prior to manufacturing, also the position of a guidance feature for surgical instruments is not determined prior to surgery, which makes this a cumbersome procedure to allow guidance of surgical instruments according to a pre-operative plan. The device is also very large in size which takes up a lot of the headroom especially above the molars.

SUMMARY OF THE INVENTION

In an aspect of embodiments of the present invention a method for fabricating a dental surgical template is provided which can be used in assisting in a surgical procedure such as placement of dental implants whereby the surgical template can be positioned on a patient oral anatomy or on an in vitro copy thereof, e.g. the dental surgical template can be fitted to and can be supported by an intra-oral structure, the body of the surgical template includes with respect to a rigid part of the intra-oral structure, a set of at least seven contact features being point contacts that contact a supporting surface of the intra-oral structure. The number of point contacts can be 8, 7 to 10, 7 to 12, 7 to 15, 7 to 20, or 7 to 30. The point contacts are point to area contacts and may be, for example spherical, spheroidal, conical, cylindrical or pyramidal shaped point contacts. The point contacts may be "zero area" point contacts, e.g. spherical, spheroidal, conical, cylindrical or pyramidal shaped point contacts where "zero area" means a point contact of 0 mm$^2$ when digitally designed. The physical contact area of such a point contact can be calculated by approximation using the Hertz model from classical point contact mechanics. The positions of these point contact features are determined prior to the manufacturing of the template, i.e. it can be part of the digital design thereof. The positions of these point contact features can comply with the mathematical condition that the surgical template and the 3D supporting surface, e.g. the rigid 3D supporting surface co-operate to achieve form-closure or force closure when the surgical template is installed on the 3D supporting surface, preferably the rigid 3D supporting surface. The surfaces of the intra-oral structures that support the template are hereafter jointly referred to as the 3D supporting surface, which is preferably a rigid 3D supporting surface. 3D supporting surfaces as used in the present application can relate to a part of a patient anatomy, e.g. jawbone, dentition, gums and the like, and/or prosthetics attached to the patient, such as teeth, installed implants, fixed or removable dentures, crowns or bridges or other restorative elements, fillings, veneerings, and/or an in vitro copy thereof. Form-closure is defined as the condition where the surgical template cannot be removed from the supporting surface in any direction by any external force acting on the template, i.e. any combination of force magnitude/force direction/force location, without deforming the supporting surface or without deforming the surgical template, the latter including displacement of the position of the contact features with respect to the body of the surgical template.

Prior to manufacturing, the template is digitally designed and comprises
1) a set minimally seven contact features that contact the digital representation of the supporting surface as point contacts, e.g. point to area contacts such as zero area point contacts. The point contacts can be spherical, spheroidal, conical or pyramidal or cylindrical in shape, for example
2) one or more guiding features for dental instruments, and
3) a body that is not in contact with the 3D supporting surface, preferably the 3D rigid supporting surface. The body connects the contact features and one or more guiding features into a single part. When installed the body is preferably not in contact with the 3D supporting surface, preferably the 3D rigid supporting surface, to avoid any interference with the action of the contact features. The body is therefore also not in contact with any other part of the intra-oral cavity which could disturb the action of the point contacts.

The physical template of the digital design can be manufactured by additive manufacturing or milling such as CNC milling or a combination thereof. The position of the point contacts e.g. point to area contacts such as the zero area point contacts of the contact features of the surgical template can be achieved by first using a computer system to mathematically determine a set of at least seven spatial positions on the digital representation of the 3D supporting surface and then using the computer system to evaluate this set of positions against the mathematical form closure or force closure condition. It is possible to manually, i.e. through human interaction, indicate an initial set of locations and then automatically, again through application of the computer system, to execute a mathematical algorithm, defining subsequent $2^{nd}$, $3^{rd}$, . . . sets of spatial positions. These can be again evaluated using the computer system against the mathematical form-closure or force closure condition. The surgical template preferably has a limited number of contact points where minimum and maximum number of contact points are defined as described above (e.g. less than 30, less than 20 or less than 15 but for example 7 or more).

To evaluate the form closure or force closure condition, the computer system executes the mathematical algorithm which makes use of the spatial coordinates of the spatial locations on the digital representation of the 3D supporting surface and these locations' respective normal directions to that digital supporting surface.

In a particular embodiment of the invention, the computer system is provided with software that is used by the computer system to digitally generate contact features, i.e. point to area contacts e.g. zero area contacts or spherical, spheroidal, conical, cylindrical or pyramidal shaped contact features that contact the digital representation of the supporting surface in point contacts, e.g. at each of the locations of the set that passes the form or force closure criterium.

For spherical shaped contacts, i.e. a particular embodiment of the invention, it is preferred that the center of the sphere which makes contact is located along the direction normal to the 3D supporting surface, preferably the 3D supporting surface in these locations. On this line, the center of the sphere is located at a distance away from the supporting surface that is exactly equal to the chosen radius of that contact sphere. As a result, the surgical template interferes with the supporting surface for this contact point in a singular point, i.e. the surface of the digitally designed contact sphere does not penetrate the digital representation of the 3D supporting surface, preferably of the rigid 3D supporting surface, in the design stage nor is it away from the digital representation of the 3D supporting surface, preferably the rigid 3D supporting surface. This defines what is meant by a zero area contact at the design stage. Preferably all of the point contacts are singular points.

The radius of any of the physical point contact features such as the physical conical, spherical, spheroidal, cylindrical, pyramidal shaped contact features should lie between 0.01 mm and 5 mm, typically contact radius sizes are preferably between 0.1 mm and 1 mm.

The part of the 3D supporting surface where contact is established with the surgical template is preferably of a rigid nature, e.g. a tooth or similar. Embodiments of the present invention provide surgical templates that can be used in the placement of dental implants or for bone levelling or reduction or for marking a surgical site, for example. The surgical template can be a single part object, where contact features, guiding features and body are one single entity, or, contact features and guiding features are assembled into the body of the surgical template. Adjustable contact features such as having a screw can be tightened by direct or angulated screw access.

A particularly advantageous embodiment of the surgical template is a surgical template having at least six static, i.e. 'locator' contact features and at least 1 active, i.e. 'clamping', contact feature.

Embodiments of the present invention also relate to software and the methods and algorithms used by that software which 1) assists in determining a set of minimally 7 contact point locations on a digital representation of the 3D supporting surface that pass the force- or form-closure condition, 2) digitally designing surgical templates including a limited set of at least 7 contact features that contact the digital representation supporting surface point to area contact such as in a zero area point contact exactly in said locations—and including, one or more guiding features for surgical instruments and a body not interacting with the supporting surface that is connecting these contact features and guiding features.

Embodiments of the present invention also relate to the method used for manufacturing surgical templates for dental implants, the templates having a limited number of contact features (e.g. less than 30, less than 20 or less than 15 and 7 or more), e.g. templates fitting to a 3D supporting surface having force- or form-closure positioning.

Embodiments of the present invention also relate to a method of installing a surgical template onto a 3D supporting surface, the templates having a limited number of said dedicated positioned contact features (e.g. less than 30, less than 20 or less than 15 and more than 7) fitting to a 3D supporting surface having force- or form-closure positioning.

Embodiments of the present invention also relate to a method of installing dental implants using a said surgical template having a limited number of contact features (e.g. less than 30, less than 20 or less than 15 and more than 7), that contact the supporting surface in point to area contact such as a zero area point contact, templates fitting to a 3D supporting surface having force- or form-closure positioning.

Embodiments of the present invention include variations in the way the clamping of the surgical template onto the 3D supporting surface is obtained. Examples of various clamping mechanisms can be (but are not limited to): clamping via use of abutting screw(s), clamping via snap-on of the surgical template onto the 3D supporting surface, clamping via initial deformation of the surgical template generating internal stress in the surgical template that results in clamping forces in the contact features, clamping via use of cantilever(s), and/or clamping via use of spring(s).

Embodiments of the present invention include variations in the material used for the body, guiding features and the contact features of the surgical template. Moreover, the body of the surgical template can comprise or consist of combinations of multiple materials. A particular embodiment of the surgical template is a one-piece surgical template made of a metal.

Embodiments of the present invention include variations in the technology used to manufacture the surgical template. Manufacturing methods can include additive layer manufacturing or more simply "additive manufacturing" methods, milling methods or manual finishing or carving or a combination thereof. A particular embodiment includes a surgical template that includes a transfer feature that allows the CNC equipment to execute milling operations (such as milling a guiding feature, e.g. drilling the hole of a cylindrical bushing, and such as milling the spherical shaped contact feature) at the correct location with respect to the body of the surgical template. This transfer feature ensures that template generated through additive manufacturing is placed into a vise (part holder for milling) in a predetermined location. Suitable materials for various different manufacturing methods include:

SLM: Ti, CoCr, (Stainless) Steel, Silver, Gold, Bronze, Brass, Aluminium

SLA: Expoxy resins, Acrylic resins, Acrylic epoxy resins, TPA

FDM: ABS, Polycarbonate, PPSU,

Milling: Metals already mentioned above, ABS, Acetal, Acrylic, POM, Glass Filled Nylon, Nylon, PEEK, Phenolic, PC, Polyethylene, Polypropylene, Polystyrene, PTFE, PVC, PPS, Polyamide polymer, Fluoropolymers, PEI, fluorocarbon resin, glass epoxy, PPE, Nylon, Nickel Alloy, Beryllium Copper, ferrous-alloys SLS: Polyamide, Glass filled polyamide, Alumide, Flame retardant polyamide, thermoplastic polyurethane Jet printing: acrylate, resins, vinyl polymer, plaster Vacuum casting: Polyurethane, TPE, ABS, PP, PC, PE In one aspect the present invention provides a surgical template for fitting to and being supported by a 3D supporting surface, the surgical template having with respect to at least a rigid part of the 3D supporting surface a set of minimally 7 (seven) contact features that contact the supporting surface in point to area contacts such as a zero area point contacts, the surgical template and the 3D supporting surface co-operating to achieve force- or form-closure when the surgical template is installed on the supporting surface. The point contacts can be spherical, spheroidal, cylindrical, pyramidal or conic contact points. The limited number of contact features and the force- or form-closure allows unique, accurate and repeatable placement of the template. Contact features can be either passive locator contact features shown in FIGS. 5a to c or active clamping contact features as shown in FIG. 5d. The limited number of contact features interface only with the rigid part of the 3D supporting surface.

Any of the following or any combination of the following can be used to achieve clamping activity in one or more of the contact features: A clamping mechanism through temporary deformation of the surgical template such that one or more contact features can be snapped onto the rigid part of the 3D supporting surface fulfilling a condition for form-closure, i.e. the template cannot be removed anymore from the supporting surface in any direction by any external force unless the supporting surface or the template is deformed or force closure.

a. A lever clamping mechanism for fulfilling a condition for form-closure, i.e. the template cannot be removed anymore from the supporting surface in any direction by any external force unless the supporting surface or the template is deformed, where deformation of the template can include the removal, deformation, dislocation of the lever clamping contact feature or force closure.

b. A spring clamping mechanism for fulfilling a condition for form closure, i.e. the template cannot be removed anymore from the supporting surface in any direction by any external force unless the supporting surface or the template is deformed, where deformation of the template can include the removal, deformation, dislocation of the spring clamping contact feature, or for force closure.

c. A screw clamping mechanism with a spherically shaped apex for fulfilling a condition for form closure, i.e. the template cannot be removed anymore from the supporting surface in any direction by any external force unless the supporting surface or the template is deformed, where deformation of the template can include the removal, deformation, dislocation of the spring clamping contact feature.

The template can be a patient specific surgical template for use in assisting placement of a dental implant, transferring markings, or reducing or levelling of a jawbone. Such a patient specific surgical template can be for use in assisting to prepare an osteotomy for a dental implant and to place the dental implant according to a pre-operative plan. The pre-operative plan contains images of a patient's anatomy, e.g. being a volumetric scanned images selected from CT or CBCT or MRI or from optical scans such as an optical scan of an in vitro model or an intraoral scan and recorded in medical images.

The surgical template can include a guidance feature provided in the surgical template for guiding a surgical tool used in an osteotomy, or in transferring markings. The osteotomy can be a bone cavity or a bone reduction or levelling. For example, the guidance feature can be a cylinder or bushing into which and through which one or more surgical components or tools can be inserted to bring them into an operative position.

The one or more surgical components or tools can be
one or more drills and/or implant placement instruments, or implant holders, or a bone piezotome for reducing or levelling of the jawbone, or
a marking device for making an intraoral marking in preparation for a subsequent surgical intervention, in a predefined position.

In another aspect of the present invention a method of making a surgical template for fitting to and being supported by a 3D supporting surface is provided, the surgical template having with respect to at least a rigid part of the 3D supporting surface a set of minimally 7 contact features that contact the supporting surface in point to area contacts such as a zero area point contacts, the surgical template and the 3D supporting surface co-operating to achieve form- or force-closure when the surgical template is fitted to the 3D supporting surface, the method comprising obtaining a pre-operative plan containing images of a patient's anatomy obtained through a volumetric scanning method selected from CT or CBCT or MRI or optical scans such as a scan of an in vitro model or an intraoral scan and recorded in medical images, generating a digital version of a surgical template for fitting to and being supported by a 3D supporting surface, preferably a rigid 3D supporting surface, providing in the surgical template a set of minimally 7 contact features that contact the supporting surface in point to are contact such as a zero area point contact (e.g. spherical, spheroidal, conic, cylindrical or pyramidal in shape) with respect to at least the rigid part of the 3D supporting surface and evaluating the surgical template as to its ability to co-operate with the 3D supporting surface achieve force- or form-closure when the surgical template is fitted to the 3D supporting surface; and fabricating the surgical template by additive manufacturing or casting or milling. The contact features are either passive locator contact features or active clamping contact features. The 3D supporting surface corresponds to a human or animal oral anatomy or a part thereof, or an in vitro copy thereof.

The rigid part of the 3D supporting surface can correspond to a part of a jawbone, natural dentition or a dental restoration, a removable denture, a fixed denture, a filling, a veneering, or the like or an in vitro copy thereof.

The in vitro copy can be a model of a human or animal dentition or part of a human or animal dentition comprising human or animal natural teeth or dental restorations, or a human or animal bone structure, or a jawbone. The in vitro copy can be made by additive manufacturing or casting or milling.

The method can include forming any of the following or any combination of the following for achieving clamping activity in one more of the contact features:
A clamping mechanism through temporary deformation of the surgical template such that one or more contact features can be snapped onto an undercut area of the rigid part of the 3D supporting surface fulfilling a condition for force-closure or form closure,
A lever clamping mechanism for fulfilling a condition for force-closure of form closure,
A spring clamping mechanism for fulfilling a condition for force-closure or form closure,
A screw clamping mechanism for fulfilling a condition for force-closure, whereby when the screw is tightened, form-closure can be achieved.

The surgical template can be made by any of additive manufacturing techniques, casting and milling or a combination thereof. The surgical template can be prepared as a patient specific surgical template for use in assisting placement of a dental implant, transferring markings, or reducing or levelling of a jawbone. The patient specific surgical template can be for use in assisting to prepare an osteotomy for a dental implant and to place the dental implant according to a pre-operative plan.

The pre-operative plan can be prepared with images of a patient's anatomy, being a volumetric scanned images selected from CT or CBCT or MRI or optical scans such as a scan of an in vitro model or an intraoral scan and recorded in medical images.

The method also includes providing a guidance feature in the surgical template for guiding a surgical tool used in an osteotomy, or in transferring markings. The osteotomy can be a bone cavity or a bone reduction or levelling.

The guidance feature can be provided as a cylinder or bushing into which and through which one or more surgical components are inserted to bring them into an operative position.

In another aspect the present invention provides a method of performing an osteotomy on a patient, the method comprising: obtaining a surgical template for fitting to and being supported by a 3D supporting surface, preferably a rigid 3D surface, the 3D surface being part of a jawbone, a natural dentition, dental restorations, removable dentures, fixed dentures, fillings, veneerings, or the like, surgical template having with respect to at least a rigid part of the 3D supporting surface a set of minimally 7 contact features that contact the supporting surface in point to area contacts such as a zero area point contacts, e.g. the point contacts can be spherical, spheroidal, cylindrical, pyramidal or conic contact points, the surgical template and the 3D supporting surface co-operating to achieve force or form closure when the surgical template is fitted to the 3D supporting surface, further comprising a guide for guiding a surgical tool used in an osteotomy. the method comprising: locating the surgical template on the 3D supporting surface and carrying out the osteotomy by manipulating the surgical tool.

In another aspect the present invention provides a system for making a surgical template for fitting to and being supported by a 3D supporting surface, the surgical template having with respect to at least a rigid part of the 3D supporting surface a set of minimally 7 contact features that contact the supporting surface in point to area contact such as a zero area point contact, the surgical template and the 3D supporting surface co-operating to achieve force- or form-closure when the surgical template is fitted to the 3D supporting surface, the system comprising a volumetric scanner selected from CT or CBCT or MRI scanner or an optical scanner such as a scan of an in vitro model or an intraoral scan and a means for recording scanned medical images;

a computer for displaying images of a patient's anatomy from a pre-operative plan, and for generating a digital version of a surgical template for fitting to and being supported by a digital version of the 3D supporting surface, and for providing in the digital version of the surgical template a set of minimally 7 contact features that contact (the digital representation of) the supporting surface in a point to area contact such as a zero area point contact with respect to at least the rigid part of the 3D supporting surface and for evaluating the surgical template as to its ability to co-operate with the 3D supporting surface to achieve force or form closure when the surgical template is fitted to the 3D supporting surface; and an additive manufacturing or casting or milling machine for fabricating the surgical template.

The point contacts can be spherical, spheroidal, cylindrical, pyramidal or conic contact points.

In another aspect the present invention provides a computer program product which when executed on a processing engine executes any of the methods of the present invention, e.g. as recited above. A non-transitory storage medium can be used for storing the computer program product.

BRIEF DESCRIPTION OF THE DRAWINGS

FIG. 5a shows a spheroidal contact feature, FIG. 5b shows a knife-edge or sharp point contact feature, FIG. 5c shows an assembled contact feature which can be made of a resilient material, and FIG. 5d shows a screw clamping contact feature.

DEFINITIONS

Figure 1A:
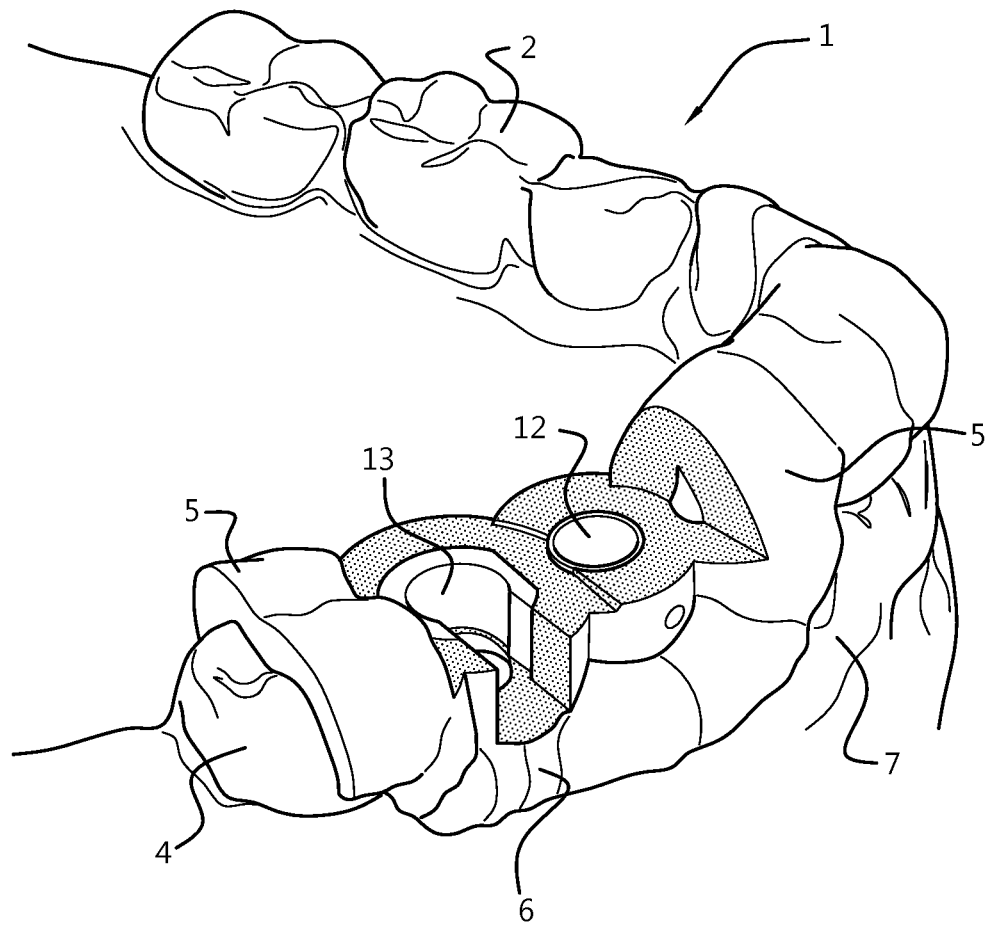
FIG. 1a shows a known surgical template for implant placement in a partial edentulous situation.
Figure 1B:
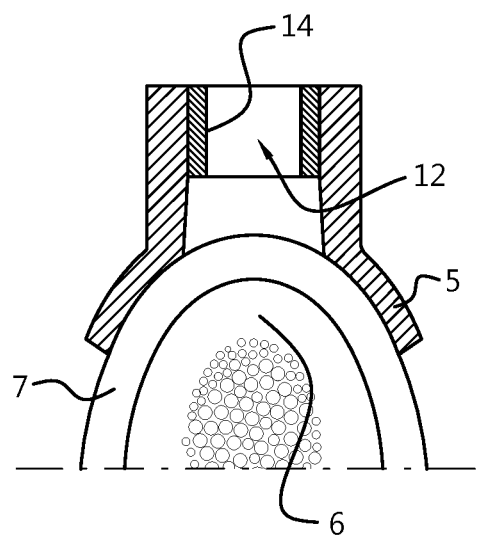
FIG. 1b shows a cross-section of a known surgical template at the position of the guiding bushing.

Force-closure positioning of the surgical template is a grasp of the surgical template on the said 3D supporting surface, preferably the rigid 3D supporting surface, whereby any motion of the surgical template with respect to the 3D supporting surface, preferably the rigid 3D supporting surface, is resisted by a contact force, which means that the 3D supporting surface, preferably the rigid 3D supporting surface, cannot break contact with the contact features without some non-zero external work.

Form-closure positioning is a more strict application of the force-closure grasp in the sense that the 3D supporting surface, preferably the rigid 3D supporting surface, cannot break contact with the contact features regardless of the magnitude and direction of any external non-deforming work. Form-closure is the condition where the surgical template cannot be removed from the 3D supporting surface in any direction by any external force acting on the template, i.e. any combination of force magnitude and force direction and force location, without deforming the 3D supporting surface or without deforming the surgical template, the latter including displacement of the position of the contact features with respect to the body of the surgical template and force-closure is a grasp of the surgical template on the 3D supporting surface where arbitrary forces and moments can be exerted on the 3D supporting surface through the geometrical design of the set of contact features and any motion of the surgical template with respect to the 3D supporting surface is resisted by a contact force, so that the 3D supporting surface cannot break contact with the set of contact features without some non-zero external work.

"Point to area contacts". The dental technician and dental practitioner recognize various contacts within the intra-oral cavity and the dental arch. These include:
point-to-point contacts
point to area contacts.
edge-to-edge contacts.
edge-to-area contacts.
area-to-Area contacts.

Point contacts as used in the present invention are point to area contacts. The skilled person therefore recognises that the point contacts as used in the present invention are conform with the knowledge of the dental technician and dental practitioner. These can be spherical, spheroidal, conical, cylindrical or pyramidal shaped point contacts or similar.

"Zero area" contacts" means a point contact of 0 $mm^2$ when digitally designed, i.e. in the design stage. The physical contact area of such a point contact can be calculated by approximation using the Hertz model from classical point contact mechanics. As a result, For example, a surgical template interferes with the 3D supporting surface for a contact point preferably in a singular point, i.e. the surface of the digitally designed contact point does not penetrate the digital representation of the 3D supporting surface, preferably of the rigid 3D supporting surface, in the design stage nor is it away from the digital representation of the 3D supporting surface, preferably the rigid 3D supporting surface.

DETAILED DESCRIPTION OF THE INVENTION

The present invention is described with respect to particular embodiments and with reference to certain drawings but the invention is not limited thereto but only by the claims. The drawings described are only schematic and are non-limiting. Where the term comprising is used in the description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In an aspect of embodiments of the present invention a surgical template is provided which can be used in assisting in a surgical procedure such as placement of dental implants. The surgical template can be positioned onto a part of a patient oral anatomy or on an in vitro copy thereof. This oral anatomy that supports the template is hereafter referred to as the 3D supporting surface. A 3D supporting surface as used in the present application relates to a part of a patient anatomy and/or prosthetics attached to the patient, i.e. part of the intra-oral cavity, such as teeth, installed implants, fixed or removable dentures, crowns or bridges or other restorative elements, fillings, veneerings, soft tissue such as the gingiva of gums or bone or an in vitro copy thereof. The 3D supporting surface is preferably a rigid surface. A rigid surface may be provided by a part of an intra-oral cavity such as a part of a patient anatomy and/or prosthetics attached to the patient, such as teeth, installed implants, fixed or removable dentures, crowns or bridges or other restorative elements, fillings, veneerings, or bone or an in vitro copy of any of these or an in vitro copy of soft tissue such as the gingiva of gums. An in vitro copy can be used to try out the template for example. Embodiments of the present invention provided surgical templates that can be used in the placement of dental implants or for bone levelling or reduction or for marking a surgical site, for example. The surgical templates having a limited number of contact features (e.g. less than 30, less than 20 or less than 15 and 7 or more) are provided with dedicated positioning such that force-closure or form-closure positioning of the surgical template on the 3D supporting surface, preferably on a rigid 3D supporting surface is achieved, which surgical template is prepared according to a pre-operative plan. The contact features can be assembled to the body of the surgical template. Adjustable contact features such as having a screw can be tightened by direct or angulated screw access.

Force-closure positioning of the surgical template is a grasp of the surgical template on the said 3D supporting surface, preferably the rigid 3D supporting surface, whereby any motion of the surgical template with respect to the 3D supporting surface, preferably the rigid 3D supporting surface, is resisted by a contact force, which means that the 3D supporting surface, preferably the rigid 3D supporting surface, cannot break contact with the contact features without some non-zero external work. Form-closure positioning is a more strict application of the force-closure grasp in the sense that the 3D supporting surface, preferably the rigid 3D supporting surface, cannot break contact with the contact features regardless of the magnitude and direction of any external non-deforming work. Force closure positioning of the surgical template is achieved with at least 2 soft-finger friction contacts or at least 3 hard-finger friction contacts or at least seven frictionless contacts. The reason for this is that a grasp with two hard-finger contacts, instead of two soft-finger contacts, cannot generate or resist torques about the line joining the two points of contact. Form-closure can only be achieved with at least seven contact features. Form-closure can be achieved with frictionless contact features. The surgical template can include more than seven contact features but these additional contact features can provide better stability even if less have been used for achieving force-closure or form-closure. The contact features should not interfere with each other and thereby the maximum number of contact features is defined by the size of the 3D supporting surface, preferably the rigid 3D supporting surface, that is covered by the body of the surgical template and the size of the contact features. The latter can be defined by a contact radius that should lie between 0.01 mm and 5 mm, typically contact radius sizes would be rather between 0.1 mm and 1 mm. For sake of simplicity, the surgical template will be said to have a limited number of contact points where minimum and maximum number of contact points are defined as described above (e.g. less than 30, less than 20 or less than 15, 7 or greater). A particularly advantageous embodiment of the surgical template is a surgical template having six static, i.e. 'locator' contact features and 1 active, i.e. 'clamping', contact feature, whereby the locator contact features are considered almost frictionless and the clamping contact feature can be with or without friction.

Embodiments of the present invention also relate to software and the methods and algorithms used by that software which assists in designing surgical templates for dental implants, the templates having a limited number of contact features, e.g. templates fitting to a 3D supporting surface, preferably a rigid 3D supporting surface, having force-closure or form-closure positioning with e.g. less than 30, less than 20 or less than 15 contact features, and 7 or more contact features.

Embodiments of the present invention also relate to the method used for manufacturing surgical templates for dental implants, the templates having a limited number of contact features (e.g. less than 30, less than 20 or less than 15 and 7 or more), e.g. templates fitting to a 3D supporting surface, preferably a rigid 3D supporting surface, having force-closure or form-closure positioning.

Embodiments of the present invention also relate to a method of installing a surgical template onto a 3D supporting surface, preferably onto a rigid 3D supporting surface, the templates having a limited number of said dedicated positioned contact features (e.g. less than 30, less than 20 or less than 15 and more than 7) fitting to a 3D supporting surface, preferably a rigid 3D supporting surface, having force-closure or form-closure positioning.

Embodiments of the present invention include variations in the way the clamping of the surgical template onto the 3D supporting surface, preferably onto the rigid 3D supporting surface is obtained. Examples of various clamping mechanisms can be (but are not limited to): clamping via use of fixation screw(s), clamping via a snap-on of the surgical template onto the 3D supporting surface, preferably onto the rigid 3D supporting surface, clamping via initial deformation of the surgical template generating internal stress in the surgical template that results in clamping forces in the contact features, clamping via use of cantilever(s), and/or clamping via use of spring(s).

Embodiments of the present invention also relate to a method of installing dental implants using a surgical template having a limited number of contact features (e.g. less than 30, less than 20 or less than 15 and seven or more), e.g. templates fitting to a 3D supporting surface, preferably a rigid 3D supporting surface having force-closure positioning or form-closure.

Embodiments of the present invention include variations in the material used for the body, guiding features and the contact features of the surgical template. Moreover, the body of the surgical template can comprise or consist of combinations of multiple materials. A particular embodiment of the surgical template is a one-piece surgical template made of a metal.

Embodiments of the present invention include variations in the technology used to manufacture the surgical template. Manufacturing methods can include additive layer manufacturing or more simply "additive manufacturing" methods, milling methods or manual finishing or carving or a combination thereof. Suitable materials for various different manufacturing methods are defined below.

SLM: Ti, CoCr, (Stainless) Steel, Silver, Gold, Bronze, Brass, Aluminium

SLA: Expoxy resins, Acrylic resins, Acrylic epoxy resins, TPA

Figure 5A:
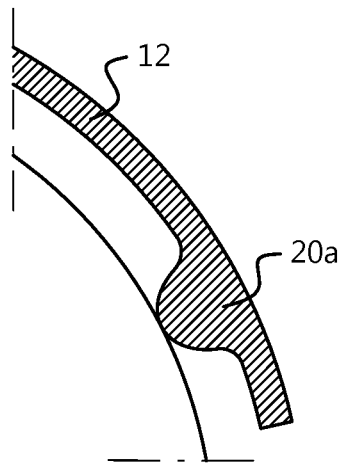
FIGS. 5a to d shows a cross-sections of further surgical templates according to further embodiments of the present invention which are in contact with a 3D supporting surface via spherical shaped (e.g. friction or frictionless) contact features. In these embodiments the 2D cross-sections of the surgical template are in form-closure with respect to a 2D cross-section of the 3D supporting surface formed by a tooth in 2-dimensional space, i.e. a plane. To achieve form-closure in 2D space, at least 4 contact features are involved, similarly minimally 7 contact features are involved to achieve form-closure in 3D space.
Figure 5B:
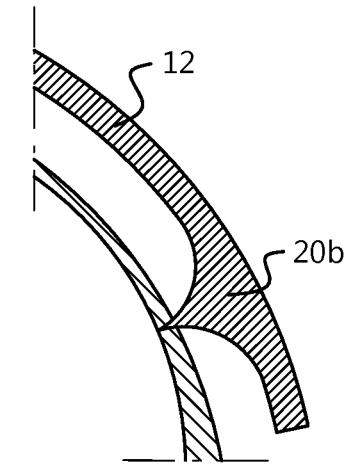
Figure 5C:
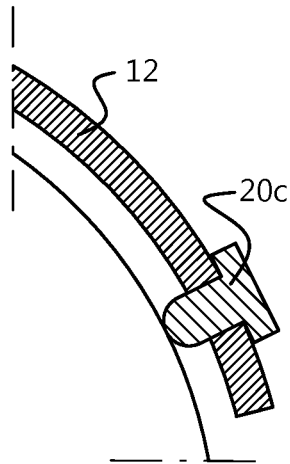
Figure 5D:
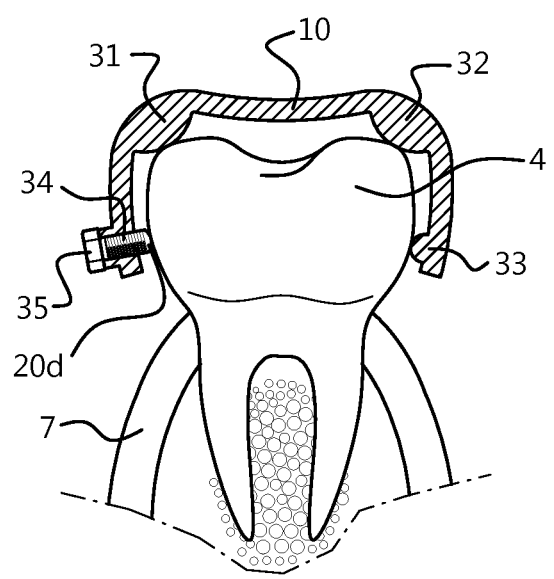

FDM: ABS, Polycarbonate, PPSU,

Milling: Metals already mentioned above, ABS, Acetal, Acrylic, POM, Glass Filled Nylon, Nylon, PEEK, Phenolic, PC, Polyethylene, Polypropylene, Polystyrene, PTFE, PVC, PPS, Polyamide polymer, Fluoropolymers, PEI, fluorocarbon resin, glass epoxy, PPE, Nylon, Nickel Alloy, Beryllium Copper, ferrous-alloys SLS: Polyamide, Glass filled polyamide, Alumide, Flame retardant polyamide, thermoplastic polyurethane Jet printing: acrylate, resins, vinyl polymer, plaster Vacuum casting: Polyurethane, TPE, ABS, PP, PC, PE In one aspect the present invention provides a surgical template for fitting to and being supported by a 3D supporting surface, preferably a rigid 3D supporting surface. The surgical template has with respect to at least a rigid part of the 3D supporting surface a limited set of friction or frictionless contact features, the surgical template and the 3D supporting surface, preferably the rigid 3D supporting surface, co-operating to achieve force-closure or form-closure when the surgical template is installed on the 3D supporting surface, preferably on the rigid 3D supporting surface. The limited number of contact points and the form- or force closure allows accurate and repeatable placement of the template. Contact features can be either passive locator contact features shown in FIGS. 5a to c or active clamping contact features as shown in FIG. 5d.

The 3D supporting surface, preferably the rigid 3D supporting surface corresponds to a human or animal oral anatomy or a part thereof, or an in vitro copy thereof such as a part of the intra-oral cavity. The 3D supporting surface should be made up of rigid components, for example the rigid part of the 3D supporting surface preferably corresponds to a part of a jawbone, natural dentition or a dental restoration, a removable denture, a fixed denture, a filling, a veneering, or the like or an in vitro copy thereof. The vitro copy can be a model of a human or animal dentition or part of a human or animal dentition comprising human or animal natural teeth or dental restorations, or a human or animal bone structure, or a jawbone. An in vitro copy can be made by additive manufacturing or casting or milling. An in vitro copy allows a dental technician who has no access to a patient to refine the design of a template.

Any of the following or any combination of the following can be used for achieving clamping activity in one more of the contact features:

a. A clamping mechanism through temporary deformation of the surgical template such that one or more contact features can be snapped onto an undercut area of the rigid part of the 3D supporting surface fulfilling a condition for force-closure or form closure, b. A lever clamping mechanism for fulfilling a condition for force-closure or form closure, c. A spring clamping mechanism for fulfilling a condition for force-closure or form closure, d. A screw clamping mechanism for fulfilling a condition for force-closure, whereby when the screw is tightened, form-closure can be achieved.

The surgical template can be made from any of additive manufacturing techniques, casting and milling or a combination thereof. The template can be a patient specific surgical template for use in assisting placement of a dental implant, transferring markings, or reducing or levelling of a jawbone. Such a patient specific surgical template can be for use in assisting to prepare an osteotomy for a dental implant and to place the dental implant according to a pre-operative plan. The pre-operative plan contains images of a patient's anatomy, e.g. being a volumetric scanned images selected from CT or CBCT or MRI or from optical scans such as an optical scan of an in vitro model or an intraoral scan and recorded in medical images.

The surgical template can include a guidance feature provided in the surgical template for guiding a surgical tool used in an osteotomy, or in transferring markings. The osteotomy can be a bone cavity or a bone reduction or levelling. For example, the guidance feature can be a cylinder or bushing into which and through which one or more surgical components or tools can be inserted to bring them into an operative position.

The one or more surgical components or tools can be
one or more drills and/or implant placement instruments, or implant holders, or a bone piezotome for reducing or levelling of the jawbone, or a marking device for making an intraoral marking in preparation for a subsequent surgical intervention, in a predefined position.

In another aspect of the present invention a method of making a surgical template for fitting to and being supported by a 3D supporting surface, preferably a rigid 3D supporting surface is provided, the surgical template having with respect to at least a rigid part of the 3D supporting surface a limited set of friction or frictionless contact features, the surgical template and the 3D supporting surface, preferably the rigid 3D supporting surface co-operating to achieve force-closure or form-closure when the surgical template is fitted to the supporting surface, preferably the rigid 3D supporting surface. The method comprises obtaining a pre-operative plan containing images of a patient's anatomy obtained through a volumetric scanning method selected from CT or CBCT or MRI or optical scans such as a scan of an in vitro model or an intraoral scan and recorded in medical images, generating a digital version of a surgical template for fitting to and being supported by a 3D supporting surface, preferably the rigid 3D supporting surface providing in the surgical template a limited set of friction or frictionless contact features with respect to at least the rigid part of the 3D supporting surface and evaluating the surgical template as to its ability to co-operate with the 3D supporting surface, preferably the rigid 3D supporting surface, to achieve force-closure or form closure when the surgical template is fitted to the 3D supporting surface, preferably the rigid 3D supporting surface; and fabricating the surgical template by additive manufacturing or casting or milling. The contact features are either passive locator contact features or active clamping contact features. The 3D supporting surface, preferably the rigid 3D supporting surface corresponds to a human or animal oral anatomy or a part thereof such as a part of an intra-oral cavity, or an in vitro copy thereof.

The rigid part of the 3D supporting surface can correspond to a part of a jawbone, natural dentition or a dental restoration, a removable denture, a fixed denture, a filling, a veneering, or the like or an in vitro copy thereof, e.g. an vitro copy of gums or gingiva.

The in vitro copy can be a model of a human or animal dentition or part of a human or animal dentition comprising human or animal natural teeth or dental restorations, or a human or animal bone structure, or a jawbone. The in vitro copy can be made by additive manufacturing or casting or milling.

The method can include forming any of the following or any combination of the following for achieving clamping activity in one more of the contact features:

A clamping mechanism through temporary deformation of the surgical template such that one or more contact features can be snapped onto an undercut area of the rigid part of the 3D supporting surface fulfilling a condition for force-closure or form closure, A lever clamping mechanism for fulfilling a condition for force-closure of form closure, A spring clamping mechanism for fulfilling a condition for force-closure or form closure, A screw clamping mechanism for fulfilling a condition for force-closure, whereby when the screw is tightened, form-closure can be achieved.

The surgical template can be made by any of additive manufacturing techniques, casting and milling or a combination thereof. The surgical template can be prepared as a patient specific surgical template for use in assisting placement of a dental implant, transferring markings, or reducing or levelling of a jawbone. The patient specific surgical template can be for use in assisting to prepare an osteotomy for a dental implant and to place the dental implant according to a pre-operative plan.

The pre-operative plan can be prepared with images of a patient's anatomy, being a volumetric scanned images selected from CT or CBCT or MRI or optical scans such as a scan of an in vitro model or an intraoral scan and recorded in medical images.

The method also includes providing a guidance feature in the surgical template for guiding a surgical tool used in an osteotomy, or in transferring markings. The osteotomy can be a bone cavity or a bone reduction or levelling.

The guidance feature can be provided as a cylinder or bushing into which and through which one or more surgical components are inserted to bring them into an operative position.

In another aspect the present invention provides a method of performing an osteotomy on a patient, the method comprising: obtaining a surgical template for fitting to and being supported by a 3D supporting surface, the 3D surface being part of a jawbone, a natural dentition, dental restorations, removable dentures, fixed dentures, fillings, veneerings, or the like, i.e. preferably a rigid 3D supporting surface, the surgical template having with respect to at least a rigid part of the 3D supporting surface a limited set of friction or frictionless contact features, the surgical template and the 3D supporting surface, preferably the rigid 3D supporting surface co-operating to achieve force-closure or form closure when the surgical template is fitted to the 3D supporting surface, preferably the rigid 3D supporting surface, further comprising a guidance for guiding a surgical tool used in an osteotomy. the method comprising: locating the surgical template on the 3D supporting surface, preferably on the rigid 3D supporting surface and carrying out the osteotomy by manipulating the surgical tool.

In another aspect the present invention provides a system for making a surgical template for fitting to and being supported by a 3D supporting surface, preferably a rigid 3D supporting surface, the surgical template having with respect to at least a rigid part of the 3D supporting surface a limited set of friction or frictionless contact features, the surgical template and the 3D supporting surface, preferably the rigid 3D supporting surface co-operating to achieve force-closure or form-closure when the surgical template is fitted to the 3D supporting surface, preferably to the rigid 3D supporting surface. The system comprises a volumetric scanner selected from CT or CBCT or MRI scanner or an optical scanner such as a scan of an in vitro model or an intraoral scan and a means for recording scanned medical images;

a computer for displaying images of a patient's anatomy from a pre-operative plan, and for generating a digital version of a surgical template for fitting to and being supported by a 3D supporting surface, preferably by a rigid 3D supporting surface and for providing in the surgical template a limited set of friction or frictionless contact features with respect to at least the rigid part of the 3D supporting surface and for evaluating the surgical template as to its ability to co-operate with the 3D supporting surface, preferably the rigid 3D supporting surface to achieve force-closure or form closure when the surgical template is fitted to the 3D supporting surface, preferably to the rigid 3D supporting surface; and an additive manufacturing or casting or milling machine for fabricating the surgical template.

In another aspect the present invention provides a computer program product which when executed on a processing engine executes any of the methods of the present invention, e.g. as recited above. A non-transitory storage medium can be used for storing the computer program product.

Figure 7:
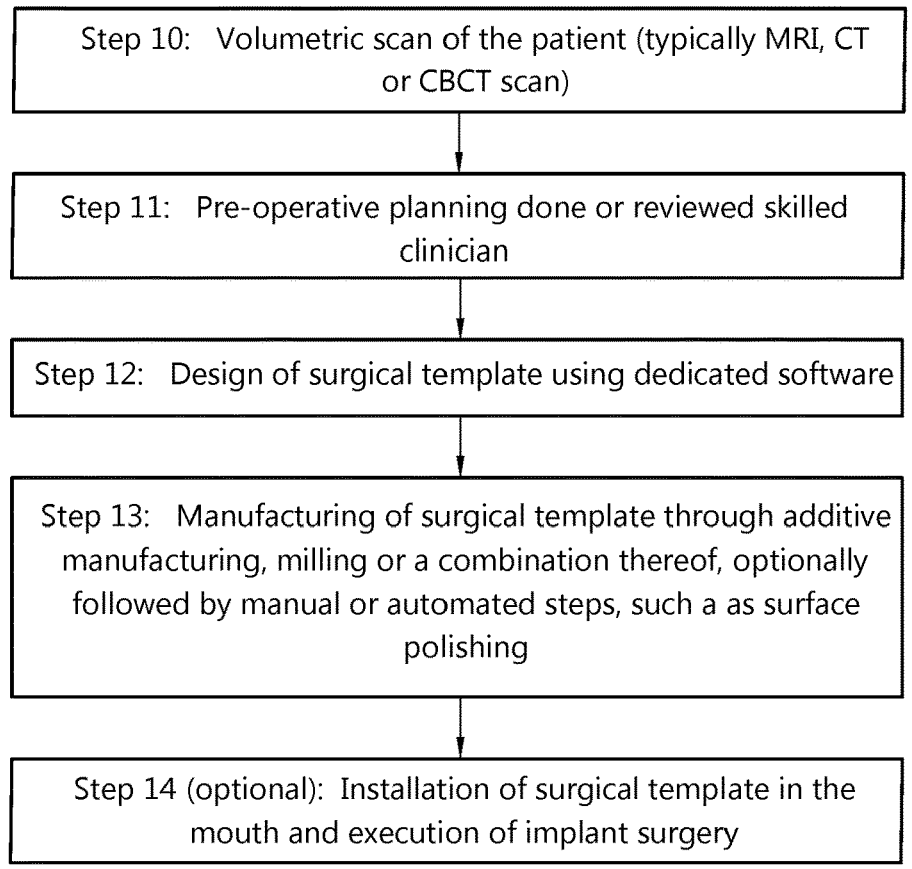
FIG. 7 shows a workflow of implant treatment with guided surgery according to an embodiment of the present invention.

Before describing embodiments of the present invention in detail, the steps of dental implant placement using computer guided surgery as illustrated in FIG. 7, and that relate to embodiments of the present inventions, are described. These steps may be included as part of embodiments of the present invention. The aim of the implant placement is to provide a patient with a dental restoration than can be fixed to the jawbone via these implants. Embodiments of the present invention relate to implant dentistry, and in particular to the design, manufacture and use of surgical templates, e.g. to guide surgical instruments such as drills and implant drivers into a position that has been for example determined in a pre-operative plan.

An input to the preoperative plan is one or more images obtained from a volumetric scan such as a conventional or cone beam (CB) scan, computer tomography (CT) scan, or an MRI scan of the patient's anatomy, e.g. the jawbone and dentition, with optionally other types of scans such as an optical scan of an in vitro model or an intraoral optical scan or extra-oral optical, CT or MRI scan. From the one or more scans, a digitization of the patient's anatomy, e.g. dentition, is obtained, e.g. by using software and conventional techniques known to the skilled person. In the pre-operative plan, the digitizations of the patient's anatomy, e.g. bone and dentition, are combined and the dental surgeon or practitioner will plan virtually implant positions in their optimal or best possible clinical and optionally esthetical position or will receive and review a pre-operative plan from a third party. The dental surgeon or practitioner will then indicate the type of 3D supporting surface the surgical template will need to support on and the type of surgical instruments that will be used with the surgical template which in term will define the position and dimension of the guiding features of the surgical template.

Once the pre-operative plan, including virtual implant planning and surgical template prescription, is finalized, software is used by a skilled person that enables the digital design of a surgical template. Subsequently, this surgical template is manufactured and sent to the dental surgeon that will execute the implant treatment surgery. During surgery, the surgical template is installed onto the 3D supporting surface in the mouth of the patient. With respect to any embodiment of the present invention a template may also be applied to an in vitro copy of the supporting surfaces in the mouth. Such an in vitro copy can be made by additive manufacturing or casting or milling for example.

Surgical templates according to embodiments of the present invention fit onto a 3D supporting surface in the patient's mouth and the 3D supporting surface can be a) one or more patient's teeth, or b) restorations such as fixed or removable dentures, bridges, fillings, veneerings, or c) the jawbone, or d) soft tissue such as the gingiva or any combination of these.

During surgery, an osteotomy is created prior to a surgical procedure such as placing an implant in the jawbone. For embodiments of the present invention, e.g. in which computer guided surgery is or can be applied, the aim is to create the osteotomy and
  a) to place an implant effectively or as accurately as possible according to the pre-operative plan, or
  b) To mark positions where a surgical step is to be carried out,
  c) To reduce or level the jawbone ridge or create a cavity.
In such embodiments a surgical template is created that will guide one or more surgical instruments, such as
  a) one or more drills and/or implant placement instruments, i.e. implant holders, or
  b) a bone piezotome for reducing or levelling of the jawbone, or
  c) a marking device for making an intraoral marking in preparation for a subsequent surgical intervention, in a predefined position.

Embodiments of the present invention can have one or more of the following characteristics:
  Surgical templates that are embodiments of the present invention include spherical, conical, pyramidal, or cylindrical shaped elements forming contact features of limited size providing discrete mechanical interfaces with the 3D supporting surface, preferably a rigid 3D supporting surface rather than continuous contact areas.
  Surgical templates that are embodiments of the present invention include contact features that are only in contact with rigid parts of a 3D supporting surface which provides a unique, stable and accurately re-positionable template.
  Surgical templates that are embodiments of the present invention can include clamping contact features, which in turn can include fixation through—abutting screws with angulated access, e.g. through the use of hexalobular screws and a screw driver
  Surgical templates that are embodiments of the present invention include spherical, spheroidal, conical, cylindrical, or pyramidal shaped contact features (i.e. line or point contacts but not continuous contact areas) that are in force-closure or more preferably form-closure positioning each of which can provide a stable and accurately re-positionable template.
  Surgical templates that include contact features that can be assembled to the body of the surgical template, thereby allowing use of different materials and hence providing different frictional properties of the contact features.

Figure 4A:
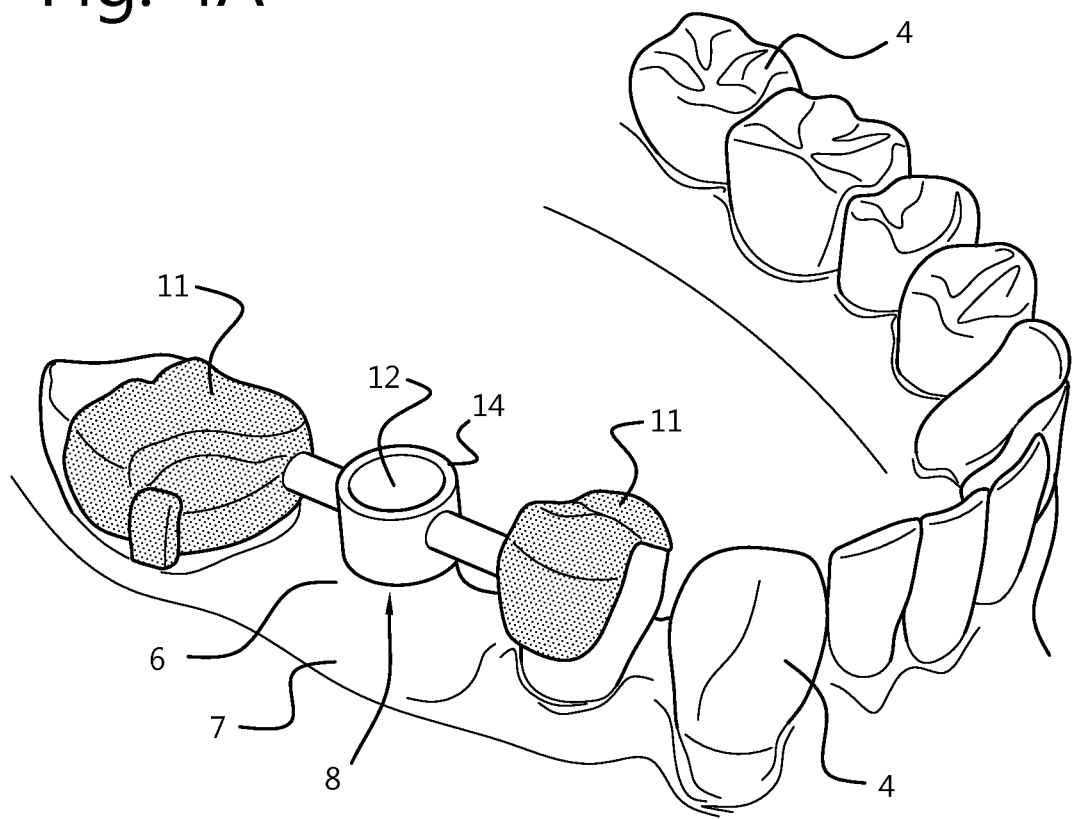
FIG. 4a shows a surgical template for implant placement in a partial edentulous situation according to an embodiment of the present invention.

A surgical template in accordance with embodiments of the present invention preferably includes one or more guiding features, typically a cylinder or a bushing or a guiding surface, to guide the one or more surgical instruments into the position and orientation as was planned in the pre-operative plan. In FIG. 4a, a surgical template 10 according to embodiments of the present invention is shown for a partial edentulous situation where the surgical template 10 is supported on a 3D supporting surface comprising, for example, teeth 4 neighboring or close to one or more surgical sites such as 6. These are one or more positions where a surgical procedure can be carried out such as an osteotomy is to be created and an implant is to be placed. The teeth 4 form part of the rigid 3D supporting surface on which a surgical template according to embodiments of the present invention will rest in a force closure or form closure manner. Some of the teeth 2 need not support the surgical template 10. Restorative elements such as fixed or removable dentures, bridges or crowns, fillings or veneerings, or bone when exposed or reachable through the gingiva can also form part of the rigid 3D supporting surface. Optionally, soft tissue 7 such as the gingiva can be used to support a part of the template 10 in addition to the rigid parts. The template 10 comprises one or more supported sections 11 and has one or more guiding features, e.g. a cylinder or bushing 14 having a bore 12 which is/are to be used to guide one or more surgical tools such as a drill. The template 10 generally will include at least two support sections 11 and a guiding feature which spans one or more surgical sites. In FIG. 4a, the guiding feature which is a cylinder 14 with bore 12 is integral (formed in one piece) with the body of the surgical template 10 and can be made of the same material e.g. especially for metal templates. Alternatively, but less preferred is to insert or embed or assemble the guiding feature such as cylinder 14 into the body of the surgical template 10. This guiding feature is shown as a cylinder 14 which requires a drill to be inserted from the top (or from the bottom for the upper jaw). However the cylinder or bushing 14 may be cut away at one side to allow a surgical tool such as a drill to be introduced from the side, This can be used when there is insufficient headroom in the mouth to insert a drill from the top (or from the bottom for the upper jaw). Embodiments of the present invention allow for integral (in one piece with the template), embedded or assembled guiding features in the body of the surgical template 10.

Figure 4B:
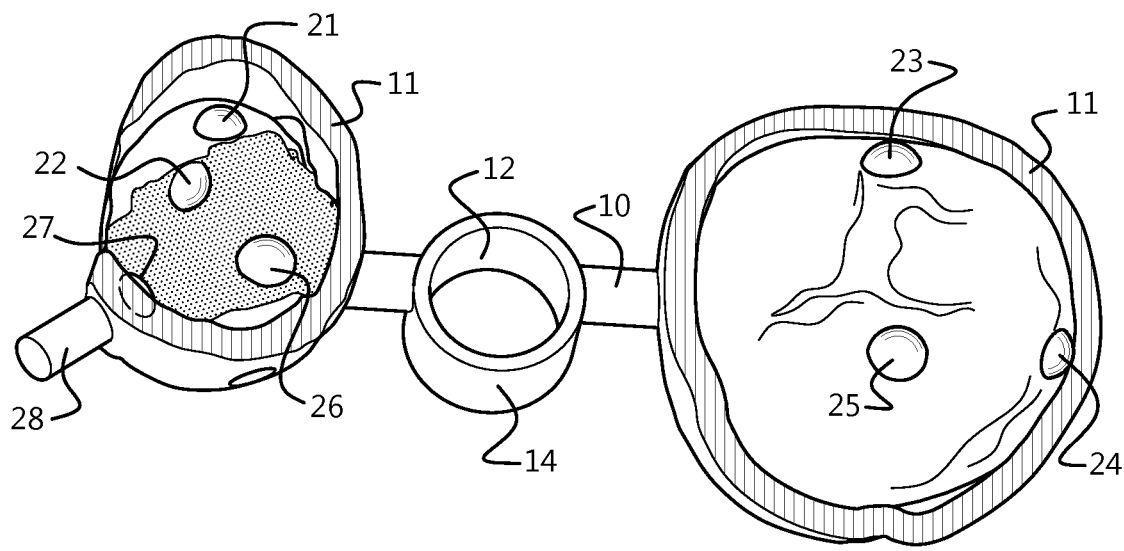
FIG. 4b shows the underneath side of a surgical template according to an embodiment of the present invention, having 6 locator contact features and 1 clamping contact feature wherein clamping is achieved through the use of an abutting screw against the 3D supporting surface. The shape of the contact features in this figure are spherical and represent only one particular embodiment of the invention. These contact features will contact the supporting surface in a point to area contact e.g. a zero area point contact at locations that are predetermined by a mathematical algorithm that evaluates force or form closure condition. For this evaluation, the algorithm uses both the spatial locations (3D coordinates) on the 3D supporting surface as well as the normal directions to the digital representation of the supporting surface in these locations. To ensure that the contact features of the surgical template will exactly contact the 3D supporting surface in these locations, the contact features should be designed such that they allow for a point to area contact i.e. a zero area point contact. For example, for spherically shaped contact features the center of that sphere is located (by the template design software) along the direction normal to the supporting surface in these locations. On this line, the center of the sphere is located at a distance away from the 3D supporting surface that is exactly equal to the chosen radius of that contact sphere. As a result, the surgical template interferes with the 3D supporting surface in a singular point, i.e. the surface of the contact sphere does not penetrate the digital representation of the 3D supporting surface nor is it away from the supporting surface.
Figure 4C:
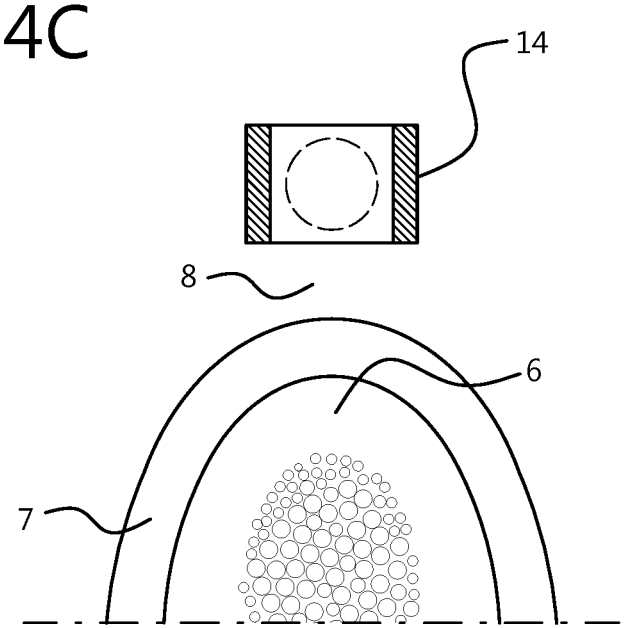
FIG. 4c shows a surgical template for implant placement in a partial edentulous situation according to an embodiment of the present invention at the position of a guiding bushing.

FIG. 4c shows a schematic cross-section through a surgical template 10 that is according to embodiments of the present invention at a position where a guiding feature (typically a cylinder or bushing 14) is integral or embedded into the body of the template 10. Embodiments of the present invention allow for either integral or embedded or assembled guiding features in the body of the surgical template 10 but the integral (one piece with the template and made of the same material) guiding feature is preferred especially for metal templates. When assembled into the body of the surgical template 10, the guiding feature such as cylinder 14 can be in the form of a bushing and can be of a different material than the material of the surgical template 10. For example the template 10 can be made of a plastic material such as an acrylic and the cylinder 14 can be in the form of a metal bushing. The guiding cylinder 14 is positioned in such lateral and vertical position and angulation that it will guide the one or more surgical instruments, (e.g. as indicated by the dental surgeon or practitioner in the pre-operative plan), into the pre-operatively planned osteotomy and implant position 6. FIG. 4c shows a space 8 between the gingiva 7 at the position 6 where the implant is to be placed and the bottom of the cylinder or bushing 14. This space 8 is optional and can be avoided by extending the guiding feature, e.g. cylinder or bushing 14, down to the gingiva 7 but when present has the following advantages:

a) it provides better visibility of the implant site 6 than a conventional template.
b) it provides room for good irrigation of the surgical tool such as a drill in operation, e.g. when drilling the bore in the jawbone into which the implant will be placed.
c) it provides sufficient space such that a flapless or mini-flap procedure can be carried out.

The 3D supporting surface of a surgical template 10 according to any of the embodiments of the present invention can be one or more teeth, a restoration or a restorative element such as a fixed or removable denture, a bridge or a crown, a filling or a veneer, a bone, e.g. a jaw bone exposed by opening a flap of soft tissue, or soft tissue such as the gingiva or a combination thereof. Surgical templates 10 for oral dental implant placement, which are embodiments of the present invention do not require the body of the surgical template 10 to be a negative of the 3D supporting surface. One, some or all embodiments of the present invention provide surgical templates 10 where the positioning of the surgical template 10 onto its 3D supporting surface is unique and repeatable, i.e. installed in the mouth, removed and re-installed in the same position with the same orientation.

Figure 2:
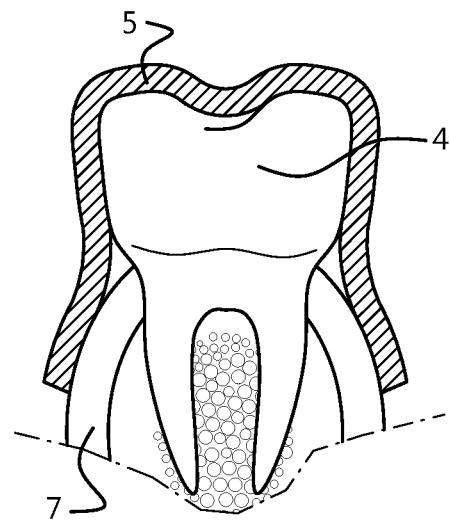
FIGS. 2 and 3 show cross-sections of a known surgical template at the position of support on teeth.
Figure 3:
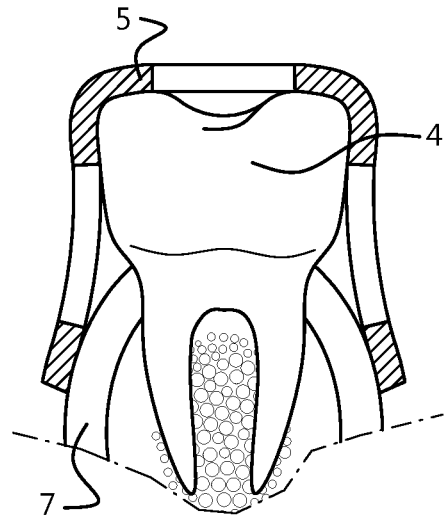

Embodiments of the present invention achieve the positioning onto the 3D supporting surface through the provision of a limited number of distinct contact features 20 (e.g. less than 30, less than 20 or less than 15 and more than 7) e.g. on a support section 11 in combination with a gap between the 3D supporting surface and the surgical template. The gap prevents the body of the template from contacting the 3D supporting surface thus leaving just the predefined limited number of contact features 20 (e.g. less than 30, less than 20 or less than 15 and more than 7) to touch the 3D supporting surface and to support the template in force or form closure. FIG. 4b shows a plurality of convex contact features 21, 22, 23, 24, 25, 26, rather than one or more large contact area(s) as shown in FIGS. 2 and 3. FIG. 4b also shows a deformable contact feature 20 such as a screw fixing or clamp 27. Deformable contact features for use in embodiments of the present invention include those where the position of the contact surface can be adjusted by means of a tool such as an adjusting screw. Such features also can be resilient contact features such as made of plastic, rubber or an elastomer or can be rigid. Elastomers can be isoprene, polyisoprene, or other synthetic rubber, for example.

An advantage of having a limited number of contact features 20 compared to having full contact between a surgical template and a 3D supporting surface, is that the likelihood of having an incorrect or unstable positioning of the surgical template is higher with a surgical template supported by a full or continuous areas contact since each single contact point of the full contact area can be a source of incorrect positioning (if not manufactured correctly), whereas it is lower for embodiments of the present invention. Contact features 20 in accordance with embodiments of the present invention are convex structures such as spheroidal, spherical, conic, pyramidal, cylindrical, a knife edge or sharp point, barrel shaped or truncated spheroidal, spherical, cylindrical, barrel shaped or knife edge or sharp point contact features. The contact features 20 can be transgingival, i.e. so that the contact feature 20 may penetrate through the gingiva and may be supported by the underlying bone but are preferably not invasive of that bone. The contact features are preferably point to area contacts. The contact features can be spherical, spheroidal, conical, pyramidal or cylindrical shaped point contacts. The contact features can be zero area contacts.

The contact features 20 can be machined, moulded, embedded or assembled into the body of the surgical template 10 and can be made of the same or a different material than the body of the surgical template 10 when assembled. Examples of different shapes of contact features are shown in FIGS. 5a, 5b, 5c. FIG. 5a depicts an integral (made in one piece with the template) e.g. embedded spheroidal contact feature 20a. The contact feature 20a can be formed from the same material as the template 10 and hence can be made from a rigid material. In additive manufacturing methods more than one material can be used, so that the material of contact feature 20a can be different from the material of the template 10 when the template is made by additive manufacturing and hence the feature 20*a* can be more resilient than the material of the template, for example. A contact feature 20*b* can be made adjustable, i.e. it can be mounted with a screw thread in a threaded portion of the template 10. FIG. 5*b* shows an integral (made in one piece with the template) or embedded knife-edge or sharp point contact feature 20*b*. The contact feature 20*b* can be formed from the same material as the template 10 and hence can be made from a rigid material. In additive manufacturing methods more than one material can be used, so that the material of contact feature 20*b* can be different from the material of the template 10 and hence the feature 20*b* can be more resilient than the material of the template, for example. A contact feature 20*b* can be made adjustable, i.e. can be mounted with a screw thread in a threaded portion of the template 10. Contact feature 20*b* can have a sharp point that can penetrate the gingiva forming a transgingival contact feature supported on the underlying bone but without penetrating the bone. A transgingival contact feature 20*b* can be made adjustable, i.e. can be mounted with a screw thread in a threaded portion of the template 10. FIG. 5*c* depicts an assembled contact feature 20*c* which can be made of the same or a different material than the body of the surgical template 10 and can therefore be more resilient than the template 10, e.g. may be made of a plastic, rubber or elastomer. A plastic can be an acrylic resin, an elastomer/rubber can be isoprene, polyisoprene, or other synthetic rubbers A contact feature 20*c* can be a forced fit in a slot or hole in the template, a snap fit in a slot or hole of the template, fixed in place with an adhesive or by soldering or welding, for example.

Figure 6:
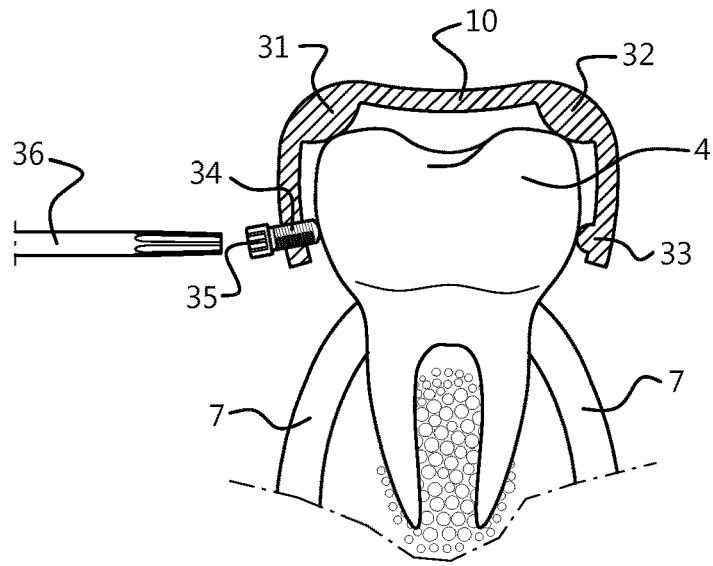
FIG. 6 shows adjustment of the contact feature as shown in FIG. 5d where clamping is achieved through the use of an abutting screw against the 3D supporting surface. It is possible that the condition for form-closure demands that the direction and position of the clamping contact feature is positioned in a difficult to reach area of the mouth of the patient. Therefore, the screw head of the abutting screw may be designed to receive an hexalobular screwdriver which allows tightening the abutting screw while the screw driver is oriented in a different direction than the direction of the abutting screw, as such allowing to position the screwdriver in a more comfortable position in the mouth while keeping the functionality to tighten the abutting screw.

FIG. 5*d* shows an adjustable contact feature 20*d* which can be made of the same or a different material than the body of the surgical template 10 and can therefore be more resilient than the template 10, e.g. may be made of a plastic, rubber or elastomer. A contact feature 20*d* can be mounted with a screw thread 34 in a threaded portion of the template 10. The supporting end of the contact feature 20*d* can be any already described, e.g. a convex structure such as spheroidal, spherical, cylindrical, a knife edge or sharp point, barrel shaped or truncated spheroidal, spherical, cylindrical, barrel shaped or knife edge or sharp point contact feature. The other end of the feature can be configured, for example as a screw head 35 to receive a tool (see FIG. 6) for adjusting the position of the feature, e.g. through rotation of a screw. The contact feature 20*d* achieves clamping through the use of an abutting screw 34 against the 3D supporting surface. The clamping contact feature 20*d* can be provided with any of the other contact features (shown as 31, 32, 33) of FIGS. 5*a* to *c*, e.g. a convex structure such as spheroidal, spherical, cylindrical, a knife edge or sharp point, barrel shaped or truncated spheroidal, spherical, cylindrical, barrel shaped or knife edge or sharp point contact feature. It is possible that the condition for force-closure or form-closure demands that the direction and position of the clamping contact feature is positioned in a difficult to reach area of the mouth of the patient. As seen in FIG. 6 the screw head 35 of the abutting screw may be designed to receive a special access tool such as a hexalobular screwdriver 36 which allows tightening the abutting screw while the screw driver is oriented in a different direction than the direction of the abutting screw, This allows positioning of the screwdriver in a more comfortable position in the mouth while keeping the functionality to tighten the abutting screw.

The contact features 20 should not interfere with each other and hence a limited number of contact features is preferred. The maximum number of contact features 20 that is suitable is defined by the size of the 3D supporting surface that is covered by the body of the surgical template and the size of the contact features. The latter can be defined by a contact radius that preferably lies between 0.01 mm and 5 mm, typical contact radii can be for example between 0.1 mm and 1 mm. The contact features are preferably point to area contacts. The contact features can be spherical, spheroidal, conical, pyramidal or cylindrical shaped point contacts. The contact features can be zero area contacts.

For sake of simplicity, the surgical template will be said to have a limited number of contact points where minimum and maximum number of contact points are defined as described above (e.g. less than 30, less than 20 or less than 15 and 7 or more). Contact features can be almost frictionless or with a frictional force which can be defined by the deformation of the template when it is installed or by adjusting the position of a contact feature 20, e.g. with a screw adjustment. Surgical templates according to the present invention can include varying materials for the contact features such as metals or plastics. The friction properties of the contact between contact feature and the 3D supporting surface largely will depend on the material properties of both the contact feature and the 3D supporting surface. Surgical templates according to embodiments of the present invention can include contact features that are either static, 'locator' or active, i.e. 'clamping' e.g. adjustable to form a clamping pressure.

Embodiments of the present invention achieve the positioning onto the 3D supporting surface by a force-closure or a form closure. A force-closure positioning of the surgical template is a grasp of the surgical template on the 3D supporting surface where one can exert arbitrary forces and moments on this 3D supporting surface through the geometrical design of these contact features and equivalently, any motion of the surgical template with respect to the 3D supporting surface is resisted by a contact force, which means that the 3D supporting surface cannot break contact with the contact features without some non-zero external work. Form-closure positioning is a more strict application of the force-closure grasp in the sense that the 3D supporting surface cannot break contact with the contact features regardless of the magnitude and direction of any external but non-deforming work. In 3D space, force-closure positioning of the surgical template can be achieved with at least 2 soft-finger friction contact features or at least 3 hard-finger friction contact features. The reason for this is that a grasp with two hard-finger contact features, instead of two soft-finger contact features, cannot generate or resist torques about the line joining the two points of contact. Form-closure can only be achieved with at least 7 contact features in 3D space. Note that in 2D space, only 4 contact features are required to achieve form-closure. The principle of form-closure in 2D space is illustrated in FIG. 5*d*. From this figure it is clear that the 3 degrees of freedom that exist in 2D space (2 translations and 1 rotation) of the surgical template with respect to the 3D supporting surface is blocked, regardless the magnitude or direction of any external work, e.g. trying to pull off or tilt the template from the 3D supporting surface, that is not deforming the surgical template or the 3D supporting surface.

As a result, surgical templates according to embodiments of present invention will at least include 2 contact features 20 and more typically have 7 or more contact features 20 (e.g. less than 30, less than 20, less than 15). The contact features are preferably point to area contacts. The contact features can be spherical, spheroidal, conical, pyramidal or cylindrical shaped point contacts. The contact features can be zero area contacts.

Surgical templates 10 according to the embodiments of the present invention include a surgical template 10 having distinct contact features that contact rigid areas of a 3D supporting surface formed by oral anatomy, such as teeth, restorative elements, implants, fillings, fixed or removable dentures, veneerings and/or jawbone. The distinct contact features 20 are preferably not in contact with soft areas of the oral anatomy, such as mucosa or gingiva, as it could compromise the uniqueness of positioning of the surgical template 10 although such contact features can be allowed alongside contact features of the present invention. If necessary a flap of soft tissue can be raised and the underlying bone used as a 3D supporting surface. Surgical templates according to embodiments of the present invention may include contact features that contact the bone surface through the gingiva without having the need to raise a flap and while being non-invasive of that bone at the contact site. Embodiments of the surgical template 10 according to the present invention can include larger contact areas that support on soft areas of the 3D supporting surface such as on the gingiva. However, this should not affect the positioning of the surgical template 10 onto the 3D supporting surface that is achieved through the distinct contact features 20 located on rigid areas of the 3D supporting surface formed by a patient's oral anatomy. Surgical templates according embodiments of the present invention can include more than 7 contact features and these can provide better stability although not required for achieving force-closure or form-closure. A particularly advantageous surgical template according to embodiments of the present invention is a surgical template having 6 static, i.e. 'locator' contact features and 1 to 3 active, i.e. 'clamping', contact feature(s), where the locator contact features are configured to be frictionless or almost frictionless and the clamping contact feature can clamp with or without making use of frictional forces. Here the 6 static locator contact features define a unique and repeatable position according to a pre-operative plan, while the force-closure or form-closure condition is achieved by adding at least one more contact feature, i.e. a clamping contact feature.

Surgical templates 10 according to embodiments of the present invention can include one or more contact features with or without friction. The contact features are preferably point to area contacts. The contact features can be spherical, spheroidal, conical, pyramidal or cylindrical shaped point contacts. The contact features can be zero area contacts. In case of frictionless contacts, each contact is a single point contact where the contact force is directed perpendicular to the 3D supporting surface at the position where the contact is made. In case of a contact with friction, the direction of the contact forces acting on friction contact features are situated in a conus with apex on the 3D supporting surface, i.e. the friction force can be decomposed in into components perpendicular and tangent to the 3D supporting surface in the point of contact.

Consider the example of the surgical template with 6 locator contact features and 1 clamping contact feature, all without friction, such that form-closure is achieved. Hence, this particular surgical template is considered to be according to the embodiments of the present invention. Below, one particular method, according to embodiments of the present invention, for obtaining the position of contact features for this surgical template is described and summarized in FIG. 8. The starting point is a pre-operative plan comprising images of the patient from which a 3D supporting surface can be extracted and defined and optionally a digital representation of a surgical template. The 3D supporting surface is preferably on rigid elements of a dentition such as teeth, restorative elements such as implants, bridges, and crowns, fillings, veneerings, fixed or removable dentures, bone and optionally soft tissue.

Figure 8:
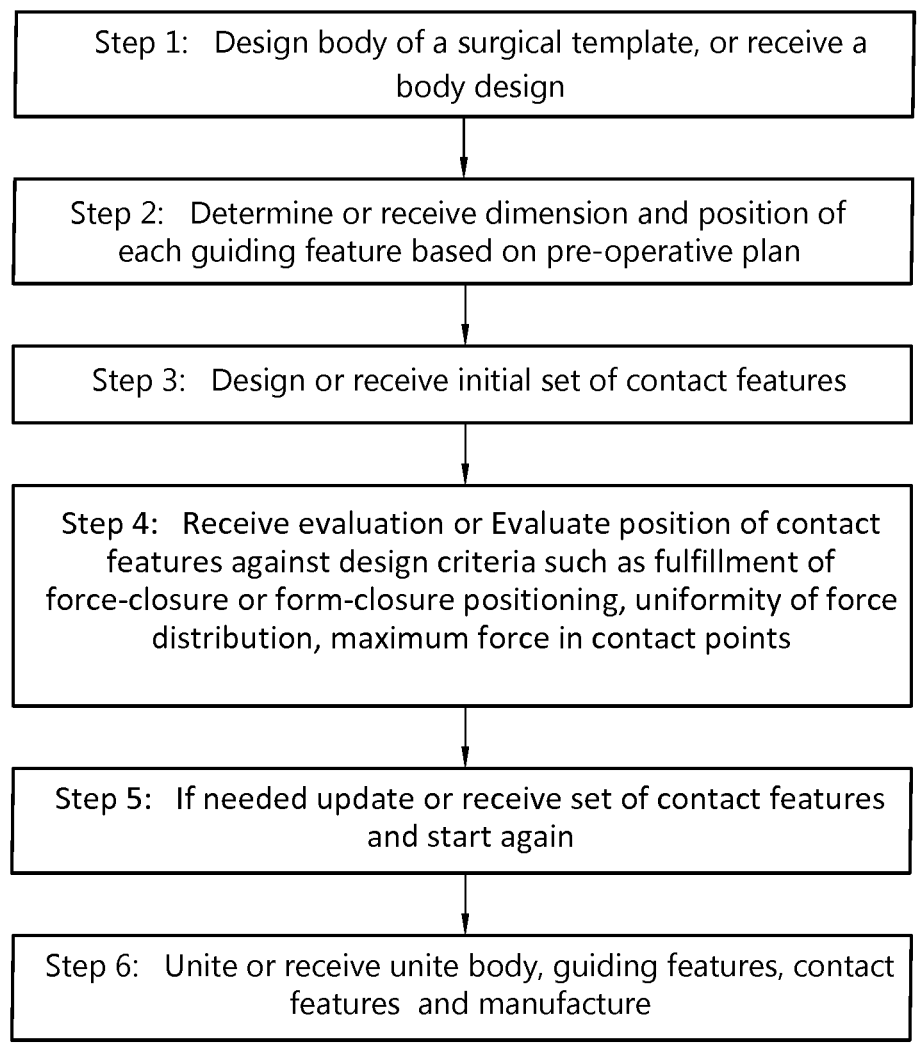
FIG. 8 Method for designing the surgical template according to an embodiment of the present invention.

In the method of designing a surgical template shown in FIG. 8 the order of steps 1, 2 and 3 can be interchanged. A method of designing a template is as follows:

a) In step 1 making use of the digital images of the patient a patient specific digital version of a surgical template is determined or the digital version of a surgical template is obtained from a third party.

b) In step 2 the guiding feature is designed or the design is received from a third party. In step 3, for form closure, the position of an initial set of 6 locator contacts and 1 clamping contact is defined on the 3D supporting surface and these positions are transferred to the digital representation of a surgical template 10. Alternatively for force closure the position of 2 soft-finger friction contacts or at least 3 hard-finger friction contacts can be chosen. The contact features are preferably point to area contacts. The contact features can be spherical, spheroidal, conical, pyramidal or cylindrical shaped point contacts. The contact features can be zero area contacts.

c) Various ways can be used to define an initial set of positions, e.g. based on previous experience or mere random choosing of 7 or more (e.g. less than 30, less than 20, less than 15) positions, e.g. to apply a Monte Carlo method to select a large number of contact location sites.

d) In step 3, besides the position, for form closure also the normal direction to the 3D supporting surface in these contact features is defined in the installed condition of the template. In embodiments for form closure, the contact features are considered to be frictionless, hence resulting in a contact force that will be in the normal direction to the 3D supporting surface at these contact points when the template is installed. Note that the forces acting on a contact feature for force closure with friction can be modelled by a friction cone, i.e. the forces acting on a contact feature with friction can be decomposed into components normal and tangential to the 3D supporting surface at that contact point.

e) In step 4, the Euler-Newton formula is applied whereby any translational or rotational movement is blocked, i.e. is zero. This results in the condition that the magnitude of the forces and torques in each of the contact features cannot be negative when the template is in the installed position. If this condition is fulfilled, the surgical template is said to have force-closure, and also in this particular example has form closure.

f) In step 5, if the condition is not met, the set of contact point positions can be updated. Again, various ways can be used to define a new set of positions, one of them being replacing one of the contact points with a randomly chosen new one. This new set of contact points is then again evaluated against the force closure or form-closure condition. This procedure can be repeated by replacing a contact feature with a different contact feature each time, e.g. a Monte Carlo method to can be applied to select and evaluate a large number of contact location sites.

g) The set of contact features can be evaluated against other criteria such as uniformity of distribution of forces and torques acting on the contact features. Iterations in renewing the set of contact features can be initiated to optimize the distribution of forces and torques when the template is in the installed position. Optimizations in uniformity of force and torque distribution includes setting up an iteration of defining a set of contact features where for each set the variance is calculated of the force and torque magnitudes over the different contact features. The set of contact features with the minimal variance, will be an optimum set for the criterion of uniform force and torque distribution. Similarly, the set of contact features can be searched for the one that has a minimized maximum force on one of the contact features. Here, the maximum magnitude of force and torque is recorded for each set of contact features. The set of contact features that has the minimal maximum magnitude, would result in the optimum set for this criterion.

h) Optionally an in vitro model of the dentition such as a stone or plaster cast can be made of the patient's dentition and the template 10 with contact features can be tried out on the plaster cast. Alternatively the template can be tried out in the mouth of the patient. If required contact features can be modified by hand, e.g. using a dentist's drill.

i) Finally, in step 6, the template with its contact features is manufactured by methods disclosed below.

Below, one particular algorithm is described for evaluating the force-closure condition for the particular example of a surgical template with 6 frictionless static 'locator' contact points and 1 active 'clamping' contact point, based on reference, "*Optimizing Fixture Layout in a point-set domain*, Wang Y. M., and Pelinescu D. M., IEEE Transactions on Robotic and automation, vol. 17, No. 3, June 2001" which is incorporated herein by reference in its entirety.

Without being limited by the theory disclosed below, other related methods are included within the scope of the present invention to obtain the position and definition of contact features for a surgical template and which methods can be applied to obtain other surgical templates over the range that are according to embodiments of the present invention. In the following contact points are point to area point contacts such as zero area point contacts. The point contacts can be spherical, spheroidal, conic, pyramidal or cylindrical for example.

Suppose that the ith contact point with position vector $r_i$ of the 3D supporting surface has a small positional perturbation $\delta r_1$ with respect to the surgical template 10. This perturbation will result in a small displacement of the entire 3D supporting surface with respect to the surgical template described by a 6×1 vector $\delta q=[\delta^T \ \delta\theta^T]^T$, including 3 translational (vector b) and 3 rotational (vector θ) components. The relation between displacements in the different contact features and the entire template can be described as follows:

$$\delta y_i = g_i^T \delta q \quad (1)$$

With 6×1 column vectors $$g_i = -\begin{bmatrix} n_i \\ (r_i \times n_i) \end{bmatrix} \quad (2)$$

where $\delta y_i = n_i^T \delta r_i$, and $n_i$ is a 3×1 vector that represents the outward (from the 3D supporting surface) unit normal vector at contact point with the surgical template. $\delta y_1$ is a scalar that is positive when the small movement has a translational component that is in the same direction of the normal at contact point, that is negative when the small movement has a translational component that is in the opposite direction of the normal at contact point, and that is 0 when the small movement is perpendicular to the normal at contact point.

The practical understanding of this is that $\delta y_i > 0$ is a (prohibited) movement of the contact point into the surgical template, that $\delta y_i < 0$ is a movement of the contact point away from (contact is lost) the surgical template, and that $\delta y_i = 0$ is a movement parallel to the surgical template (contact is kept). For a surgical template with m contact features with the 3D supporting surface, the individual perturbation equations can be collected into a single formula describing the whole surgical template system as:

$$\delta y = G^T \delta q \quad (3)$$

Where $\delta y = [\delta y_i \ \delta y_2 - \delta y_m]^T$ and $G = [g_1 \ g_2 \ldots g_m]$ 6×n matrix completely characterizes the kinematics of the fixing of the surgical template onto the 3D supporting surface via the n different contact features. Deterministic localization is a fundamental requirement indicating that the workpiece cannot make any infinitesimal motion without losing contact with at least one locator. This is true if and only if the locator matrix G has a full rank of six, i.e. rank G=6.

Consider a particular embodiment of the presented invention with static locator contact features and a clamp defined by the position vector $r_c$ and the unit surface normal $n_c$. For the contact point, the clamping force applied on the 3D supporting surface is given as:

$$F_c g_c \lambda_c = -[n_c^T (r_c \times n_c)^T]^T \lambda_c \quad (4)$$

Where) $\lambda_c > 0$ represents the clamping force magnitude. Let Q represent all external forces applied on the 3D supporting surface relative to the surgical template considered fixed in space. More intuitively, Q represents all forces such as gravity, manual pulling, manual pushing, etc. applied to the surgical template relative to the 3D supporting surface. Then, the equilibrium equation is given as $$Gt + g_c \lambda_c + Q = 0 \quad (5)$$

Here, the first term represent the internal forces in the static locator contacts, the second term represents the forces in the active clamp contact and the third term represents external forces applied to the surgical template. Where the nonnegative n×1 column vector $t=[t_1 \ t_2 \ldots t_n]^T$ is a collection of the magnitudes of each generalized contact force $f_i$ where $f_i = t_i g_i$ The general form for the solution of this equation for the intensities (magnitudes) of the locator contact forces t can be expressed as $$t = -G^+ - G^+ g_c \lambda_c + (1-P)_Y \quad (6)$$

Where $G^+ = G^T(GG^T)^{-1}$ and $P = G^+ G$.

Here is $G^+$ the pseudo-inverse of G, P is the prediction matrix and y is an arbitrary n×1 vector. The first two terms are the particular solutions of the equation and represent the magnitudes of the locator contact forces in response to the exterior forces Q and the clamping action, respectively. The last term represents the homogeneous solution and it corresponds to the internal forces among locators. Because the locators are passive element, these internal forces should not arise physically. Therefore, the last term must be ignored and the force-closure requirement becomes (next to the requirement that the rank of G=6):

$$t_i = -g_i^T M^{-1}(Q + g_c \lambda_c) > 0 \quad (7)$$

for i=1 . . . n with n the number of contact features, where $M = GG^T$ and is called the Fisher information matrix of the fixture, which is the surgical template in this case. The analysis shows that the force-closure condition depends simultaneously on locations ($g_i$) of each locator as well as that of the clamp ($g_c$). Moreover, if the force-closure condition is satisfied for each clamp separately, then any combination of the clams shall satisfy the condition also. Therefore, force-closure analysis for a multi-clamp fixture can be reduced to a successive one-clamp fixture analysis.

The above derivation of the condition for force-closure is applicable for a particular embodiment of the presented invention, i.e. in the case of frictionless contact features with 6 locator contact features and one clamping contact point. Other configurations of surgical templates that are also according to embodiments of the presented invention can include contact features friction. The forces acting in a contact point with friction can be represented by a friction cone where tangent components of the friction force need to be taken into consideration. Similar algorithms as the algorithm described above can be applied to find the force-closure condition when contact features with friction are involved (see for example ref. *Closure problem and Force optimization in fixtures and robotic manipulation*, J. Ma, M. Y. Wang and X. Zhu, $6^{th}$ annual IEEE Conference on automation science and engineering, Canada, 2010, which is incorporated herein by reference in its entirety).

The skilled person is aware that there exist several method flows to find locator positions that meet the force-closure requirement or performance optimization requirements as mentioned in the previous paragraph. The present invention is not limited by the specific method flows described above but includes within its scope any such method flows. Embodiments of the present invention include any design of a surgical template that satisfies the force-closure condition or a form closure, regardless of the method flow used to obtain a set of contact features that fulfills either of these conditions.

A surgical template 10 according to embodiments of the present invention has a layout design that comprises or consists of two aspects:

locator position determination and clamp configuration design for force-closure or form closure. For a given 3D supporting surface, there may exist a large number of sets of contact features for a surgical template according to embodiments of the present invention to satisfy the conditions of force-closure or form closure. Embodiments of the present invention include surgical templates with fixture performance criteria such as a) accuracy localization (i.e. robustness of positional accuracy of the surgical template against positional errors of the locators); b) minimization of locator contact forces, and c) optimized balance of locator forces. Embodiments of the presented invention can optionally, but are not required to, include these optimized performance conditions.

Embodiments of the present invention include surgical templates 10 having various ways of clamping of the surgical template onto the 3D supporting surface. Examples of various clamping mechanisms that can be included in surgical templates according to embodiments of the present invention (but are not limited to): clamping via use of abutting screw(s), clamping via snap-on of the surgical template onto the 3D supporting surface whereby initial deformation of the surgical template generates internal stress in the surgical template that results in clamping forces on the contact features, clamping via use of lever(s), clamping via use of spring(s), clamping by means of a cantilever, etc. For example, FIG. 4b is a visualization of a particular embodiment of the present invention of a surgical template with 6 locator contact features 21, 22, 23, 24, 25, 26 and 1 clamping point 27 where clamping is achieved through the use of an abutting screw 28 against the 3D supporting surface.

Embodiments of the present invention include variations in the material used for the body, the guiding features and the contact features of a surgical template. This can have several advantages, such as the ability to vary the frictional properties of contact features. Moreover, the body of a surgical template can comprise or consist of combinations of multiple materials. For example, a particular embodiment of the surgical template 10 can be a one-piece surgical template made of a noble metal such as Titanium, a Titanium alloy such as Titanium Aluminium, or Titanium Vanadium, Cobalt or a Cobalt alloy such as Cobalt Chromium or Cobalt Molybdenum. Surgical templates where the body is conceived to be a metal framework can have particular advantages over other materials such as polymer-based materials such as hardened epoxy resins, because of:

a) Good form stability and resistance to heat, moisture or radiation, which can be beneficial for sterilization of the surgical template
b) The extra strength of metal allows a spacious (minimalist) design giving excellent access to the implant site for good irrigation during drilling, better visibility and the use of mini-flap surgery.
c) Ease of repeatable fitting in the correct position which also allows more accurate implant alignment.
d) Integrated bore holes rather than bushings which simplifies manufacture of the template and increases accuracy of the drill guide.
e) All of these will contribute to a better treatment for the patient both as far as cost is concerned and also technical and aesthetic quality.

However use of metal templates has been limited and the present invention provides advantageous improvements such as reducing the contact areas of contact features making accurate placement easier.

Surgical templates according to embodiments of the present invention can be manufactured by a variety of methods. In particular embodiments of the present invention include manufacturing methods which generate surgical templates from volumetric or other scans such as CT scans, CBCT scans and MRI scans or optical scans. Manufacturing methods included within the scope of the present invention can include additive layer manufacturing or more simply "additive manufacturing" methods, milling methods or a combination thereof. The art term additive manufacturing should be understood in a broad sense. ISO/ASTM52900-15 defines seven categories of AM processes: Binder Jetting, Directed Energy Deposition, Material Extrusion, Material Jetting, Powder Bed Fusion, Sheet Lamination and Vat Photopolymerization. Such methods move through a 3D work envelope transforming a mass of raw material into a desired shape by additions of material layer by layer. Other terms for additive manufacturing include desktop manufacturing, rapid manufacturing, rapid prototyping, and on-demand manufacturing or on-demand printing or 3D printing. Additive processes are included within the scope of the present invention independent of the way layers are deposited to create parts and in the materials that are used. Suitable methods can include melting or softening of a material to produce the layers, for example. selective laser melting (SLM) or direct metal laser sintering (DMLS), selective laser sintering (SLS), fused deposition modeling (FDM), or fused filament fabrication (FFF), also including curing of liquid materials using different technologies, such as stereolithography (SLA), or laminated object manufacturing (LOM). Any, some or all of additive manufacturing methods in accordance with embodiments of the present invention include use of sacrificial and support materials if required.

Suitable materials are any of:
SLM: Ti, CoCr, (Stainless) Steel, Silver, Gold, Bronze, Brass, Aluminium
SLA: Expoxy resins, Acrylic resins, Acrylic epoxy resins, TPA
FDM: ABS, Polycarbonate, PPSU,
Milling: Metals already mentioned above, ABS, Acetal, Acrylic, POM, Glass Filled Nylon, Nylon, PEEK, Phenolic, PC, Polyethylene, Polypropylene, Polystyrene, PTFE, PVC, PPS, Polyamide polymer, Fluoropolymers, PEI, fluorocarbon resin, glass epoxy, PPE, Nylon, Nickel Alloy, Beryllium Copper, ferrous-alloys
SLS: Polyamide, Glass filled polyamide, Alumide, Flame retardant polyamide, thermoplastic polyurethane
Jet printing: acrylate, resins, vinyl polymer, plaster
Vacuum casting: Polyurethane, TPE, ABS, PP, PC, PE.

Embodiments of the present invention can include combined methods. A particular embodiment of the present invention uses a combination of selective laser melting (SLM) and computer numerical control (CNC) milling. In this particular embodiment, the milling step can follow the additive manufacturing step (SLM) to accurately determine the final position and shape of the contact features and to other dimension of the guiding feature, such as the inner diameter of the guiding cylinder. When a combination of manufacturing techniques such as described in the aforementioned particular embodiment, a reference between the printing build plate and the milling setup is preferably used, such that milling events occur at the right spot on the device. Options are at least:

Hub: guides (1 or more) are connected to a hub during printing. After printing, the hub and the attached guides are placed onto a dedicated hub placeholder to have a reference during milling.

Reference object on the printing build plate. This would allow milling directly on the printing build plate, i.e. batch milling, and would avoid the design and building of a hub.

Embodiments of the present invention also include other manufacturing methods which are subtractive machining including carving or milling by hand from a design provided by method flows explained above for example.

After manufacture of a surgical template according to embodiments of the present invention and after any fitting adjustments required, a computer guided treatment can be carried out as shown in FIG. 7. In steps 10 to 13 a surgical template is designed and manufactured as described above. In step 14 the template is placed in the mouth of the patient located on the 3D supporting surface, e.g. surface of teeth, restorative elements such as implants, bridges, crowns, fillings, veneerings, fixed or removable dentures or bone, the one or more guiding features are used to guide a surgical tool. For example the tool can be one or more drills for drilling the hole in the bone where an implant will be placed, or implant placement instruments, i.e. implant holders, or a bone piezotome for reducing or levelling of the jawbone, or a marking device for making an intraoral marking in preparation for a subsequent surgical intervention, in a predefined position. The form of the template can allow a good visibility to the surgical site and also allow good irrigation to the surgical site.

The present invention also relates to a system comprising a variety of devices having digital processing capability such as computer for manipulating images, a CNC milling machine, an additive manufacturing device, a scanner such as a CT, CBCT, MRI or optical scanner. These devices can include one or more microprocessors, microcontrollers, such as a central processing unit (CPU) and/or a Graphics Processing Unit (GPU), which carry out their respective functions by being programmed with software, i.e. one or more computer programmes.

Any, some or all of these devices may have memory (such as non-transitory computer readable medium, RAM and/or ROM), an operating system, a display such as a fixed format display, data entry devices such as a keyboard, a pointer device such as a "mouse", serial or parallel ports to attach to other devices, network cards and connections to connect to any of the networks.

The software can be adapted to carry out the following functions when the software is loaded onto the respective device or devices and executed on one or more processing engines such as microprocessors, ASIC's, FPGA's etc:

Obtaining digital images of the patient's dentition;
Allowing processing and manipulations of digital images of the patient's dentition, Extracting and displaying a 3D supporting surface for a surgical template, allowing a digital version of the template to be located in images of the patient's dentition and for determining, displaying and altering a patient specific digital version of the surgical template.

The software can be adapted to carry out the following functions when the software is loaded onto the respective device or devices and executed on one or more processing engines such as microprocessors, ASIC's, FPGA's etc:

For form closure, displaying the position of an initial set of contact features such as 6 locator contacts and 1 clamping contact on the 3D supporting surface and for transferring these positions onto the digital representation of a surgical template. Alternatively for force closure displaying the position of 2 soft-finger friction contacts or at least 3 hard-finger friction contacts.

Optionally, for form closure; allowing the defining of the normal direction to the 3D supporting surface for these contact features when the template is in the installed position on the 3D supporting surface. For form closure, the contact features can be considered to be frictionless, hence resulting in a contact force that will be in the normal direction to the 3D supporting surface at these contact points when the template is installed. The forces acting on a contact feature for force closure with friction can be modelled by a friction cone, i.e. the forces acting on a contact feature with friction can be decomposed into components normal and tangential to the 3D supporting surface at that contact point.

The software can be adapted to carry out the following functions when the software is loaded onto the respective device or devices and executed on one or more processing engines such as microprocessors, ASIC's, FPGA's etc:

Application of the Euler-Newton formula whereby any translational or rotational movement is blocked, i.e. is zero, resulting in the condition that the magnitude of the forces and torques in each of the contact features cannot be negative when the template is in the installed position. If this condition is fulfilled, the surgical template is said to have force-closure, and possibly form closure.

If the condition is not met, the software is adapted to allow the set of contact point positions to be updated, e.g. allowing various ways to define a new set of positions, one of them being replacing one of the contact points with a randomly chosen new one.

The software can be adapted to allow every set of contact points to be evaluated against the force closure or form-closure condition.

The software can be adapted to allow each set of contact features to be evaluated against other criteria such as uniformity of distribution of forces and torques acting on the contact features.

The software can be adapted to allow iterations in renewing the set of contact features to optimize the distribution of forces and torques when the template is in the installed position.

The software can be adapted to allow optimizations in uniformity of force and torque distribution and can include setting up an iteration of defining a set of contact features where for each set the variance is calculated of the force and torque magnitudes over the different contact features.

The software can be adapted to allow the set of contact features with the minimal variance, to be chosen as an optimum set for the criterion of uniform force and torque distribution.

The software can be adapted to allow searching each set of contact features for the one that has a minimized maximum force on one of the contact features.

The software can be adapted to allow recording of the maximum magnitude of force and torque for each set of contact features.

The software can be adapted to select the set of contact features that has the minimal maximum magnitude.

The contact features can be spherical, spheroidal, conical, pyramidal or cylindrical shaped point contacts.

The contact features can be zero area contacts.

The software can be adapted to allow generate digital files of template with its contact features suitable for manufacture, e.g. files for additive manufacture, CNC milling etc.

Any of the above software may be implemented as a computer program product which has been compiled for a processing engine in any of the above devices, including a network device such as a server. The computer program product may be stored on a non-transitory signal storage medium such as an optical disk (CD-ROM or DVD-ROM), a digital magnetic tape, a magnetic disk, a solid state memory such as a USB flash memory, a ROM, etc.

The invention claimed is:

1. A dental surgical template for fitting to a 3D supporting surface defined by a part of an intra-oral cavity, the surgical template comprising:
    a body that includes one or more guiding features for guiding one or more dental instruments; and
    a set of at least seven contact features, each contact feature being configured to contact a rigid part of the 3D supporting surface with a point contact being a point to area contact with each point contact being configured to contact the rigid part of the 3D supporting surface in a singular point contact and the body connecting the set of contact features and the one or more guiding features into a single part,
    the dental surgical template with the set of contact features being configured to co-operate with the 3D supporting surface to achieve form-closure when the surgical template is installed on the 3D supporting surface and configured so that the body is not in contact with the 3D supporting surface, and a clamping mechanism through temporary deformation of the surgical template such that one or more contact features can be snapped onto the rigid part of the 3D supporting surface fulfilling a condition for form closure,
    wherein form-closure is the condition where the surgical template cannot be removed from the 3D supporting surface in any direction by any external force acting on the template without deforming the 3D supporting surface or without deforming the surgical template, the latter including displacement of the position of the contact features with respect to the body of the surgical template.

2. The surgical template of claim 1, wherein at least 6 contact features are passive locator contact features and at least one contact feature is an active clamping contact feature.

3. The surgical template of claim 1, wherein the point contacts are spherical, spheroidal, conical, pyramidal or cylindrical shaped point contacts.

4. The surgical template of claim 1, wherein the point contacts are zero area contacts.

5. The surgical template according to claim 1, wherein the rigid part of the 3D supporting surface corresponds to a part of a jawbone, natural dentition or a dental restoration, a removable denture, a fixed denture, a filling, a veneering, or an in vitro copy thereof.

6. The surgical template according to claim 1, wherein the surgical template is made from any of additive manufacturing techniques, casting and milling or a combination thereof.

7. The surgical template according to claim 1, wherein the surgical template is made from a combination of an additive manufacturing technique and CNC milling where the final shape and position of the physical contact features are obtained by the CNC milling.

8. The surgical template according to claim 7 further comprising a reference feature allowing a CNC tool used during the CNC milling to determine a location on the body of the dental surgical template.

9. The surgical template according to claim 1, wherein the surgical template is a patient specific surgical template for use in assisting placement of a dental implant, transferring markings, or reducing or levelling of a jawbone.

10. The surgical template according to claim 1, wherein the surgical template is a patient specific surgical template for use in assisting to prepare an osteotomy for a dental implant and to place the dental implant according to a pre-operative plan.

11. The surgical template according to claim 10, wherein the pre-operative plan contains images of a patient's anatomy, said images being volumetric scanned images selected from CT or CBCT or MRI or an optical scan and recorded in medical images.

12. The surgical template according to claim 1, wherein the guidance features are provided in the surgical template for guiding a surgical tool for use in an osteotomy, or in transferring markings.

13. The surgical template according to claim 12, wherein the osteotomy is a bone cavity or a bone reduction or levelling.

14. The surgical template according to claim 1, wherein one or more surgical components can be inserted into or through the guidance feature to bring them into an operative position.

15. The surgical template according to claim 14, wherein the one or more surgical components are one or more drills and/or implant placement instruments, or implant holders, or a bone piezotome for reducing or levelling of the jawbone, or a marking device for making an intraoral marking in preparation for a subsequent surgical intervention, in a predefined position.

16. A method of making a surgical template for fitting to and being supported by a 3D supporting surface, the 3D supporting surface being defined by a part of an intra-oral cavity of a person, the surgical template having with respect to at least a rigid part of the 3D supporting surface a limited set of contact features, the surgical template and the 3D supporting surface co-operating to achieve form-closure when the surgical template is fitted to the 3D supporting surface, the method comprising:

obtaining a pre-operative plan containing images of a patient's anatomy obtained through a volumetric scanning method selected from CT or CBCT or MRI or an optical scan of an in vitro model or an optical intra-oral scan and recorded in medical images, generating a digital version of a surgical template for fitting to and being supported by the 3D supporting surface, providing in the surgical template a limited set of contact features with respect to at least the rigid part of the 3D supporting surface, the contact features being point to area contacts, and evaluating the surgical template as to its ability to co-operate with the 3D supporting surface to achieve form closure when the surgical template is fitted to the 3D supporting surface;

wherein form-closure is the condition where the surgical template cannot be removed from the 3D supporting surface in any direction by any external force acting on the template without deforming the 3D supporting surface or without deforming the surgical template, the latter including displacement of the position of the contact features with respect to the body of the surgical template, and fabricating the surgical template by additive manufacturing or casting or milling or a combination thereof.

17. The method of claim 16, wherein the point contacts are spherical, spheroidal, conical, pyramidal or cylindrical shaped point contacts.

18. The method of claim 16, wherein the point contacts are zero area contacts.

19. A non-transitory storage medium storing a computer program product which when executed on a processing engine executes the method of claim 16.

20. A system for making a surgical template for fitting to and being supported by a 3D supporting surface, the 3D supporting surface being defined by a part of an intraoral cavity of a person, the surgical template having with respect to at least a rigid part of the 3D supporting surface a limited set of contact features, the contact features being area to point contacts, the surgical template and the 3D supporting surface co-operating to achieve form-closure when the surgical template is fitted to the supporting surface, the system comprising a volumetric scanner selected from CT or CBCT or MRI scanner or an optical scanner and a means for recording scanned medical images;

a computer for displaying images of a patient's anatomy from a pre-operative plan, and for generating a digital version of a surgical template for fitting to and being supported by a 3D supporting surface, and for providing in the surgical template a limited set of contact features with respect to at least the rigid part of the 3D supporting surface and for evaluating the surgical template as to its ability to co-operate with the 3D supporting surface to achieve form closure when the surgical template is fitted to the supporting surface by clamping through temporary deformation of the surgical template such that one or more contact features can be snapped onto the rigid part of the 3D supporting surface fulfilling at least a condition for form closure; and an additive manufacturing or casting or milling machine or a combination thereof for fabricating the surgical template.

21. The system of claim 20, wherein the point contacts are spherical, spheroidal, conical, pyramidal or cylindrical shaped point contacts.

22. The system of claim 21, wherein the point contacts are zero area contacts.

23. A method of preparing a surgical template for manufacturing using a computer system to design the surgical template digitally, the method comprising:

providing a set of contact features that contact a first digital representation of a 3D supporting surface in point to area contact, the first digital representation of the 3D supporting surface being defined by a part of an inter-oral cavity of a person, providing a second digital representation of one or more guiding features for a dental instrument, and providing a third digital representation of a body that is not in contact with the 3D supporting surface and that connects the set of contact features and the one or more guiding features into a single part, the positions of the set of contact features being achieved by the computer system by first mathematically determining at least seven spatial positions on the first digital representation of the 3D supporting surface where point contact is to occur between the surgical template and the 3D supporting surface, positions of the set of contact features being determined by the computer system through a mathematical algorithm that evaluates, against a mathematical form-closure condition, a set of locations on the first digital representation of the 3D supporting surface and the locations' respective normal directions to the first digital representation of the 3D supporting surface, the set of contact features of the surgical template being such that the features contact the first digital representation of the 3D supporting surface in a zero area point contact exactly in these locations.

24. The method of claim 23, wherein contact features are spherical, spheroidal, conical, pyramidal or cylindrical shaped point contacts.

25. The method of claim 24, wherein for spherical or spheroidal shaped point contacts, the center of a spherical or spheroidal contact feature is located on a line normal to the first digital representation of the 3D supporting surface at the locations that were determined by the mathematical algorithm to be in the force or form-closure condition, the position of the center along the normal line depending on the chosen radius.

26. The method of claim 25, wherein the combination of radius and the center of the contact sphere is such that a zero area point contact is achieved in the previously determined locations on the 3D supporting surface.

27. The method of claim 25, wherein a physical template is achieved through additive manufacturing, casting or CNC milling or a combination thereof of the digital design surface.

28. The method of claim 23, wherein the contact features are zero area contacts.

* * * * *